US012005277B2

(12) United States Patent
Martin et al.

(10) Patent No.: US 12,005,277 B2
(45) Date of Patent: *Jun. 11, 2024

(54) RESPIRATOR HAVING OPTICALLY ACTIVE EXHALATION VALVE

(71) Applicant: 3M INNOVATIVE PROPERTIES COMPANY, St. Paul, MN (US)

(72) Inventors: Philip G. Martin, Forest Lake, MN (US); Caroline M. Ylitalo, Stillwater, MN (US); Gina M. Buccellato, Eagan, MN (US); James M. Jonza, Lake Elmo, MN (US); William W. Merrill, Mahtomedi, MN (US); Douglas S. Dunn, Woodbury, MN (US); David T. Yust, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/136,737

(22) Filed: Dec. 29, 2020

(65) Prior Publication Data

US 2021/0113859 A1 Apr. 22, 2021

Related U.S. Application Data

(63) Continuation of application No. 14/901,814, filed as application No. PCT/US2014/046627 on Jul. 15, 2014, now Pat. No. 10,905,903.

(Continued)

(51) Int. Cl.

*A62B 9/00* (2006.01)
*A62B 18/02* (2006.01)

(Continued)

(52) U.S. Cl.

CPC ............ *A62B 9/006* (2013.01); *A62B 18/025* (2013.01); *A62B 18/084* (2013.01); *A62B 18/10* (2013.01); *A62B 23/025* (2013.01)

(58) Field of Classification Search

CPC ........ A62B 9/006; A62B 18/10; A61M 16/20; A61M 16/201; A61M 16/204;

(Continued)

(56) References Cited

U.S. PATENT DOCUMENTS

| | | | |
|---|---|---|---|
| 715,052 | A | 12/1902 | Goodwin |
| 1,440,358 | A | 12/1922 | Whetstone |

(Continued)

FOREIGN PATENT DOCUMENTS

| | | |
|---|---|---|
| CA | 2213332 | 9/1996 |
| EM | 001909623-0001 | 8/2001 |

(Continued)

OTHER PUBLICATIONS

"20 Pack NIOSH N95 Respirator", Menards, [retrieved from the internet on Jun. 29, 2017], URL <http://www.menards.com/main/paint/drop-cloths-plastic-sheeting/protective-wear/respiratory-protection/20-pack-niosh-n95-respirator/p-2006906-c-13847.htm> pp. 1-2.

(Continued)

*Primary Examiner* — Margaret M Luarca

(57) ABSTRACT

Various embodiments of a respirator that includes a harness, a mask body, and an exhalation valve are disclosed. The exhalation valve can include a valve seat and a flexible flap that is in engagement with the valve seat. The flexible flap can have one or more materials that can cause the flap to flash when moving from a closed position to an open position or vice versa. The flashing valve can make it easier for a user to ascertain whether the valve is operating properly.

19 Claims, 6 Drawing Sheets

Related U.S. Application Data

(60) Provisional application No. 61/846,456, filed on Jul. 15, 2013.

(51) Int. Cl.
*A62B 18/08* (2006.01)
*A62B 18/10* (2006.01)
*A62B 23/02* (2006.01)

(58) Field of Classification Search
CPC .............. A61M 16/205; A61M 16/206; A61M 16/207; A61M 16/208; A61M 16/209; F16K 15/16
See application file for complete search history.

(56) References Cited

U.S. PATENT DOCUMENTS

| | | | | |
|---|---|---|---|---|
| D72,020 | S | 2/1927 | Labram | |
| 1,628,090 | A | 5/1927 | Weiss | |
| 1,867,478 | A | 7/1932 | Hermann | |
| 1,987,922 | A | 1/1935 | Blatt | |
| 2,012,505 | A | 8/1935 | Goldsmith | |
| 2,029,947 | A | 2/1936 | Schmitt | |
| 2,072,516 | A | 3/1937 | Ferenci | |
| D109,390 | S | 4/1938 | Bux | |
| D112,562 | S | 11/1938 | Huizing | |
| 2,230,770 | A | 2/1941 | Van Almelo | |
| 2,265,529 | A | 12/1941 | Kemp | |
| 2,281,744 | A | 5/1942 | Brunner | |
| 2,565,124 | A | 8/1951 | Durborow | |
| 2,634,725 | A | 4/1953 | Presti | |
| 2,752,916 | A | 7/1956 | Haliczer | |
| RE24,549 | E | 10/1958 | Haliczer | |
| 2,895,472 | A | 7/1959 | Matheson | |
| 3,014,479 | A | 12/1961 | Matheson | |
| 3,059,637 | A | 10/1962 | Senne | |
| 3,082,767 | A | 3/1963 | Matheson | |
| 3,220,409 | A | 11/1965 | Liloia | |
| 3,288,138 | A | 11/1966 | Sachs | |
| 3,308,816 | A | 3/1967 | Franklin | |
| 3,557,265 | A | 1/1971 | Chisholm | |
| 3,652,895 | A | 3/1972 | Tsuneta | |
| 3,736,928 | A | 6/1973 | Andersson | |
| 3,752,157 | A | 8/1973 | Malmin | |
| 3,768,100 | A | 10/1973 | Colman | |
| 3,855,046 | A | 12/1974 | Hansen | |
| 3,983,900 | A | 10/1976 | Airhart | |
| 3,994,319 | A | 11/1976 | Airhart | |
| 4,077,404 | A | 3/1978 | Elam | |
| D249,279 | S | 9/1978 | Backlund | |
| 4,248,220 | A | 2/1981 | White | |
| 4,300,240 | A | 11/1981 | Edwards | |
| 4,300,549 | A | 11/1981 | Parker | |
| 4,306,584 | A | 12/1981 | Schlobohm | |
| RE31,285 | E | 6/1983 | Van Turnhout | |
| D270,110 | S | 8/1983 | Moore | |
| 4,419,993 | A | 12/1983 | Petersen | |
| 4,454,881 | A | 6/1984 | Huber | |
| 4,628,927 | A | 12/1986 | Ward | |
| 4,630,604 | A | 12/1986 | Montesi | |
| D287,649 | S | 1/1987 | Zdrok | |
| 4,643,182 | A | 2/1987 | Klein | |
| 4,719,911 | A | 1/1988 | Carrico | |
| 4,790,306 | A | 12/1988 | Braun | |
| 4,807,619 | A | 2/1989 | Dyrud | |
| 4,827,924 | A | 5/1989 | Japuntich | |
| 4,867,148 | A | 9/1989 | Gomez | |
| 4,873,972 | A | 10/1989 | Magidson | |
| 4,934,362 | A | 6/1990 | Braun | |
| 4,941,467 | A | 7/1990 | Takata | |
| 4,941,470 | A | 7/1990 | Hubbard | |
| 4,951,664 | A | 8/1990 | Niemeyer | |
| 4,971,052 | A | 11/1990 | Edwards | |
| 4,974,586 | A | 12/1990 | Wandel | |
| 4,981,134 | A | 1/1991 | Courtney | |
| 5,035,006 | A | 7/1991 | Hetz | |
| 5,035,239 | A | 7/1991 | Edwards | |
| 5,062,421 | A | 11/1991 | Burns | |
| 5,103,337 | A | 4/1992 | Schrenk | |
| D326,541 | S | 5/1992 | McBrearty | |
| D334,633 | S | 4/1993 | Rudolph | |
| 5,217,794 | A | 6/1993 | Schrenk | |
| 5,285,816 | A | 2/1994 | Herlihy | |
| D347,298 | S | 5/1994 | Japuntich | |
| D347,299 | S | 5/1994 | Bryant | |
| 5,322,061 | A | 6/1994 | Brunson | |
| 5,325,892 | A | 7/1994 | Japuntich | |
| 5,355,910 | A | 10/1994 | Gies | |
| 5,360,659 | A | 11/1994 | Arends | |
| 5,394,568 | A | 3/1995 | Brostrom | |
| 5,464,010 | A | 11/1995 | Byram | |
| D366,697 | S | 1/1996 | Drummond | |
| 5,486,949 | A | 1/1996 | Schrenk | |
| 5,509,436 | A | 4/1996 | Japuntich | |
| D377,979 | S | 2/1997 | Plaschko | |
| 5,617,849 | A | 4/1997 | Springett | |
| D380,545 | S | 7/1997 | Nozaki | |
| D384,151 | S | 9/1997 | Raufman | |
| D384,152 | S | 9/1997 | Raufman | |
| 5,687,767 | A | 11/1997 | Bowers | |
| 5,701,892 | A | 12/1997 | Bledstein | |
| D389,239 | S | 1/1998 | Scholey | |
| 5,819,731 | A | 10/1998 | Dyrud | |
| 5,825,543 | A | 10/1998 | Ouderkirk | |
| 5,829,433 | A | 11/1998 | Shigematsu | |
| 5,865,172 | A | 2/1999 | Butler | |
| 5,882,774 | A | 3/1999 | Jonza | |
| 5,924,420 | A | 7/1999 | Reischel | |
| D413,166 | S | 8/1999 | Snow | |
| D420,769 | S | 2/2000 | White | |
| 6,045,894 | A | 4/2000 | Jonza | |
| 6,047,698 | A | 4/2000 | Magidson | |
| D424,688 | S | 5/2000 | Bryant | |
| 6,062,220 | A | 5/2000 | Whitaker | |
| 6,062,221 | A | 5/2000 | Brostrom | |
| 6,095,143 | A | 8/2000 | Dyrud | |
| 6,096,247 | A | 8/2000 | Ulsh | |
| 6,119,692 | A | 9/2000 | Byram | |
| 6,123,077 | A | 9/2000 | Bostock | |
| D431,647 | S | 10/2000 | Henderson | |
| 6,125,849 | A | 10/2000 | Williams | |
| D434,879 | S | 12/2000 | Cole | |
| 6,157,490 | A | 12/2000 | Wheatley | |
| 6,179,948 | B1 | 1/2001 | Merrill | |
| 6,186,140 | B1 | 2/2001 | Hoague | |
| 6,207,260 | B1 | 3/2001 | Wheatley | |
| 6,210,266 | B1 | 4/2001 | Barton | |
| 6,277,178 | B1 | 8/2001 | Holmquist-Brown | |
| 6,332,465 | B1 | 12/2001 | Xue | |
| 6,352,761 | B1 | 3/2002 | Hebrink | |
| D458,364 | S | 6/2002 | Curran | |
| 6,457,473 | B1 | 10/2002 | Brostrom | |
| 6,460,539 | B1 | 10/2002 | Japuntich | |
| 6,484,722 | B2 | 11/2002 | Bostock | |
| RE37,974 | E | 2/2003 | Bowers | |
| 6,530,374 | B1 | 3/2003 | Ferraro | |
| 6,531,230 | B1 | 3/2003 | Weber | |
| 6,783,349 | B2 | 8/2004 | Neavin | |
| 6,797,366 | B2 * | 9/2004 | Hanson | G02B 5/0841 359/485.02 |
| 6,843,248 | B2 | 1/2005 | Japuntich | |
| 6,854,463 | B2 | 2/2005 | Japuntich | |
| 6,939,499 | B2 | 9/2005 | Merrill | |
| 6,945,249 | B2 | 9/2005 | Griesbach, III | |
| 7,013,895 | B2 | 3/2006 | Martin | |
| 7,019,905 | B2 | 3/2006 | Weber | |
| 7,028,689 | B2 | 4/2006 | Martin | |
| 7,057,816 | B1 | 6/2006 | Allen | |
| 7,069,930 | B2 | 7/2006 | Bostock | |
| 7,069,931 | B2 | 7/2006 | Curran | |
| 7,117,868 | B1 | 10/2006 | Japuntich | |
| RE39,493 | E | 2/2007 | Yuschak | |
| 7,178,528 | B2 | 2/2007 | Lau | |

(56) References Cited

U.S. PATENT DOCUMENTS

| | | | | |
|---|---|---|---|---|
| 7,188,622 | B2 | 3/2007 | Martin | |
| 7,195,015 | B2 | 3/2007 | Kuriyama | |
| D546,942 | S | 7/2007 | Taylor | |
| 7,256,936 | B2 | 8/2007 | Hebrink | |
| 7,302,951 | B2 | 12/2007 | Mittelstadt | |
| 7,311,104 | B2 | 12/2007 | Japuntich | |
| 7,316,558 | B2 | 1/2008 | Merrill | |
| 7,428,903 | B1 | 9/2008 | Japuntich | |
| 7,493,900 | B1 | 2/2009 | Japuntich | |
| 7,503,326 | B2 | 3/2009 | Martin | |
| D665,536 | S | 8/2012 | Jenke | |
| 8,276,586 | B2 * | 10/2012 | Hustveit | A61M 16/208 128/205.24 |
| 8,365,771 | B2 | 2/2013 | Xue | |
| D681,881 | S | 5/2013 | Pong | |
| D726,970 | S | 4/2015 | Martin | |
| D877,306 | S | 3/2020 | Liu | |
| 2002/0046754 | A1 | 4/2002 | Baumann | |
| 2002/0104543 | A1 | 8/2002 | Hollander | |
| 2002/0170563 | A1 | 11/2002 | Japuntich | |
| 2002/0195109 | A1 | 12/2002 | Mittelstadt | |
| 2003/0005934 | A1 | 1/2003 | Japuntich | |
| 2003/0084902 | A1 | 5/2003 | Japuntich | |
| 2003/0221690 | A1 | 12/2003 | Lee | |
| 2004/0004547 | A1 | 1/2004 | Appelt | |
| 2004/0055078 | A1 | 3/2004 | Griesback, III | |
| 2004/0104543 | A1 | 6/2004 | Sakuma | |
| 2004/0261795 | A1 | 12/2004 | Brunell | |
| 2006/0130842 | A1 | 6/2006 | Kleman | |
| 2006/0137691 | A1 | 6/2006 | Klemen | |
| 2006/0149209 | A1 | 7/2006 | Malchow | |
| 2007/0107734 | A1 | 5/2007 | Brunell | |
| 2007/0144524 | A1 * | 6/2007 | Martin | A62B 18/025 128/205.27 |
| 2008/0092909 | A1 | 4/2008 | Hahne | |
| 2008/0178884 | A1 | 7/2008 | Gerson | |
| 2008/0271739 | A1 | 11/2008 | Facer | |
| 2009/0078264 | A1 | 3/2009 | Martin | |
| 2009/0133700 | A1 | 5/2009 | Martin | |
| 2009/0151734 | A1 | 6/2009 | Park | |
| 2009/0235934 | A1 | 9/2009 | Martin | |
| 2010/0065058 | A1 | 3/2010 | Ungar | |
| 2010/0083967 | A1 | 4/2010 | Kuriyama | |
| 2011/0249332 | A1 | 10/2011 | Merrill | |
| 2011/0255163 | A1 | 10/2011 | Merrill | |
| 2011/0255167 | A1 | 10/2011 | Merrill | |
| 2011/0286095 | A1 | 11/2011 | Merrill | |
| 2012/0012177 | A1 | 1/2012 | Muduli | |
| 2012/0167890 | A1 | 7/2012 | Insley | |
| 2013/0094084 | A1 | 4/2013 | Merrill | |
| 2013/0094085 | A1 | 4/2013 | Merrill | |
| 2013/0094088 | A1 | 4/2013 | Merrill | |
| 2013/0095434 | A1 | 4/2013 | Dunn | |
| 2013/0095435 | A1 | 4/2013 | Dunn | |
| 2013/0100647 | A1 | 4/2013 | Sherman | |
| 2013/0153035 | A1 | 6/2013 | Young | |
| 2013/0170034 | A1 | 7/2013 | Merrill | |
| 2014/0135668 | A1 | 5/2014 | Belalcazar | |

FOREIGN PATENT DOCUMENTS

| | | |
|---|---|---|
| EP | 183059 | 6/1986 |
| EP | 1366784 | 12/2003 |
| EP | 1417988 | 5/2004 |
| EP | 2070563 | 6/2009 |
| EP | 2142261 | 1/2010 |
| EP | 3226707 | 6/2019 |
| FR | 2641597 | 7/1990 |
| FR | 2621459 | 12/1990 |
| FR | 2688287 | 9/1993 |
| FR | 2889916 | 8/2006 |
| GB | 388638 | 3/1933 |
| GB | 504232 | 4/1939 |
| GB | 2103491 | 2/1983 |
| GB | 2237746 | 5/1991 |
| GB | 2433701 | 3/2010 |
| JP | 8332239 | 12/1996 |
| JP | 2003-265635 | 9/2003 |
| JP | 3622958 | 12/2004 |
| JP | 3138154 | 11/2007 |
| KR | 20-2000-0004542 | 8/1998 |
| SU | 11567 | 9/1929 |
| TW | 349412 | 4/1987 |
| WO | 1999/47010 | 9/1999 |
| WO | WO 2010/075340 | 7/2010 |
| WO | WO 2010/075357 | 7/2010 |
| WO | WO 2010/075363 | 7/2010 |
| WO | WO 2010/075373 | 7/2010 |
| WO | WO 2010/075383 | 7/2010 |
| WO | WO 2016-090067 | 6/2016 |
| WO | WO 2016-182989 | 11/2016 |

OTHER PUBLICATIONS

Davies, "The Separation of Airborne Dust Particles", Proceedings of the Institution of Mechanical Engineers 1B, 1953, pp. 185-213.

Galemed Oxi.Plust™ Oxygen Mask [retrieved from internet on Jul. 24, 2017] http://www.medicalexpo.com/prod/galemed-corporation/product-68550-774148.html#product-item_510581.

"Honeywell SAF-T-FIT Plus Disp. N95 Particulate Respirator Boomerang Nose Seal—Molded Cup-Valve-OV", [retrieved from the internet on Jul. 18, 2017], URL<https://www.fullsource.com/honeywell-n1125ov>, 3 pgs.

External definition, Merriam Webster Online Dictionary, definition 1, https://www.merriam-webster.com/dictionary/external (Year 2020).

Interior definition, Merriam Webster Online Dictionary, definition 1, https://www.merriam-webster.com/dictionary/interior (Year 2020).

"Respiratory Safety", Protective Industrial Products, [retrieved from the internet on Jun. 29, 2017], URL <http://www.pipusa.com/en/products/?scID=2566&ccID=11571&sID=27955&ssID=79604&pID=47677>, p. 1.

Wente, "Manufacture of Super Fine Organic Fibers", Report No. 4364, Navel Research Laboratories, May 25, 1954, 24pgs.

Wente, "Superfine Thermoplastic Fibers", Industrial Engineering Chemistry, 1956, vol. 48, pp. 1342-1346.

3M 1818 Surgical Mask, retrieved from the internet on Apr. 26, 2023: https://www.zoro.com/3m-surgical-face-mask-tieon-one-size-fits-most-50bx-1818/i/G407662334/?utm_source=google&utm_medium=surfaces&utm_campaign=shopping%20feed&utm_content=free%20google%20shopping%20clicks&gclid=CjwKCAjw9J2iBhBPEiwAErwpeRrTj7W7Gul1OzV9YVfsU9jpwJomY0aOjHgHz5iC7WpOVKDFZ9nGSRoCpIEQAvD_BwE.

3M 1833 Surgical Mask, retrieved from the internet on Apr. 26, 2023: https://www.tigermedical.com/Products/Ultra-Soft-Tie-On-Surgical-Mask_MMM1833.aspx.

3M Infection Prevention Solutions, 3MTM Surgical mask, Respirators and Eyewear brochure, 2011.

3M Infection Prevention, Surgical Masks and Respirators brochure, 2008.

Glendale Optical Company Product Literature for "Glendale Respiratory Protection" (Feb. 1983).

3M 1820 Mask, retrieved from the internet on Apr. 26, 2023: https://www.tigermedical.com/Products/Earloop-Procedure-Masks-with-Optional-Face-Shield__MMM1820-.aspx.

Tecnol Duckbill Surgical Mask, retrieved from internet on Apr. 26, 2023: https://www.henryschein.co.nz/infection-control/masks/masks-tie-on/tecnol-duckbill-surgical-mask-tie-on-blue-box-of-50.

Tecnol PCM 2000 Mask, retrieved from the internet on Apr. 26, 2023: https://www.henryschein.com/US-en/Shopping/ProductDetails.aspx?productid=1182394&cdivld=specialmarkets_d&name=Tecnol%20PCM2000%20Earloop%20Face%20Mask%20Pouch%20Style%20Yellow%20300/Ca&ShowProductCompare=true&FullPageMode=true.

* cited by examiner

RESPIRATOR HAVING OPTICALLY ACTIVE EXHALATION VALVE

The present disclosure pertains to a respirator that has an exhalation valve that flashes while in operation.

BACKGROUND

Persons who work in polluted environments commonly wear respirators to protect themselves from inhaling airborne contaminants. Respirators typically have a fibrous or sorbent filter that is capable of removing particulate and/or gaseous contaminants from the air. When wearing a respirator in a contaminated environment, wearers are comforted with the knowledge that their health is being protected, but they are, however, contemporaneously discomforted by the warm, moist, exhaled air that accumulates around their face. The greater this facial discomfort is, the greater chances are that the wearer will remove the mask from his or her face to alleviate the unpleasant condition.

To reduce the likelihood that a wearer will remove the mask from his or her face in a contaminated environment, respirator manufacturers often install an exhalation valve on the mask body to allow the warm, moist, air to be rapidly purged from the mask interior. The rapid removal of the exhaled air makes the mask interior cooler, and, in turn, benefits worker safety because mask wearers are less likely to remove the respirators from their faces to eliminate the hot moist environment that is located around their noses and mouths.

For many years, commercial respiratory masks have used "button-style" exhalation valves to purge exhaled air from mask interiors. The button-style valves typically have employed a thin circular flexible flap as the dynamic mechanical element that lets exhaled air escape from the interior gas space. The flap is centrally mounted to a valve seat through a central post. Examples of button-style valves are shown in U.S. Pat. Nos. 2,072,516; 2,230,770; 2,895,472; and 4,630,604. When a person exhales, a circumferential portion of the flap is lifted from the valve seat so that the air can rapidly pass into the exterior gas space.

Button-style valves have represented an advance in the attempt to improve wearer comfort, but investigators have made other improvements, an example of which is the "butterfly-style" valve shown in U.S. Pat. No. 4,934,362 to Braun. The valve described in this patent uses a parabolic valve seat and an elongated flexible flap mounted in butterfly fashion.

After the Braun development, another innovation was made in the exhalation valve art by Japuntich et al. See U.S. Pat. Nos. 5,325,892 and 5,509,436. The Japuntich et al. valve uses a single flexible flap that is mounted off-center in cantilevered fashion to minimize the exhalation pressure that is required to open the valve. When the valve-opening pressure is minimized, less power is required to operate the valve, which means that the wearer does not need to work as hard to expel exhaled air from the mask interior when breathing. See also U.S. Pat. No. 7,493,900 to Japuntich et al.

Other valves that have been introduced after the Japuntich et al. valve also have used cantilevered mounted flaps. See U.S. Pat. Nos. 5,687,767 and 6,047,698. In yet another development, the seal surface of the valve seat has been made of a resilient material to allow a more rigid, yet stiffer flap to be used, which improved the valve efficiency. See U.S. Pat. No. 7,188,622 to Martin et al.

Although the evolution of exhalation valve design has been centered mainly around structural changes relative to the valve seat and the mounting of the flap to it, investigators also have made structural changes to the flap itself to improve valve performance. For example, in U.S. Pat. Nos. 7,013,895 and 7,028,689 to Martin et al., multiple layers were introduced into the flap to enable a thinner, more dynamic flap to be used, which allowed the valve to open more easily under less pressure drop. Ribs and pre-curved, non-uniform, configurations also have been provided in the flap to allow it to be seated to the seal surface when in the closed position. See U.S. Pat. No. 7,302,951 to Mittelstadt et al. In U.S. Patent Publication No. 2009/0133700 to Martin et al., slots were provided in the valve flap at the hinge to improve valve performance. Also, in U.S. Patent Publication No. 2012/0167890A to Insley et al., the flap was ablated in selected areas to achieve desired valve performance.

Regardless of their construction, exhalation valves run the risk of staying open during use. Moisture from a wearer's exhaled breath can build up on the valve flap and on the corresponding valve seat. Salivary particles and other matter also may contribute to this build up. The presence of such substances may cause the valve flap to stick in an open or closed position. A valve that remains open may enable contaminants to enter the interior gas space of the respirator; while a valve that is closed may cause an uncomfortable pressure drop across the mask body. When a wearer notices a sticking valve, it is important to replace the respirator at the earliest convenience, particularly when the valve is in the open position. For this to occur, the wearer needs to be placed on notice that the valve is not operating properly. The present disclosure provides one or more embodiments of a valve that addresses this notification issue.

SUMMARY

In one aspect, the present disclosure provides a respirator that includes a harness, a mask body, and an exhalation valve. The exhalation valve includes a valve seat and a flexible flap that is in engagement with the valve seat. The flexible flap includes one or more materials that cause the flap to flash when moving from a closed position to an open position or vice versa.

In another aspect, the present disclosure provides a respirator that includes a mask body; a harness attached to the mask body; and an exhalation valve that includes a valve seat and a flexible flap that is in engagement with the valve seat. The flexible flap includes a band shifting film.

One or more embodiments of the valves described herein can provide a flashing signal when in operation. The signal can be generated passively from incident light in the ambient environment striking the materials of the valve flap. The flap materials may be fashioned to reflect the ambient light differently at different angles. Thus, when the valve flap is moving, it displays a different degree of light, which creates a "flash" or a "flashing image" to a person examining the valve flap. The valve flap also may be tailored to produce different colors when opening and closing, which create or add to the flashing type image. Because one or more embodiments of valves described herein can be noticeable to the wearer or to a wearer's coworkers when the respirator is being used, proper functioning of the valve can be easy to discern.

Glossary

The terms set forth below will have the meanings as defined:

"band shifting" means displaying a noticeably different color to the human eye when viewed at a different angle; band shifting can be evaluated according to the Band Shifting Test set forth herein;

"clean air" means a volume of atmospheric ambient air that has been filtered to remove contaminants;

"comprises (or comprising)" means its definition as is standard in patent terminology, being an open-ended term that is generally synonymous with "includes," "having," or "containing." Although "comprises," "includes," "having," and "containing" and variations thereof are commonly-used, open-ended terms, this disclosure also may be suitably described using narrower terms such as "consists essentially of," which is semi open-ended term in that it excludes only those things or elements that would have a deleterious effect on the performance of the subject matter to which the term pertains;

"dichroic" means being able to absorb one of two orthogonal polarizations of incident light more strongly than the other;

"exhalation valve" means a valve that opens to allow exhaled air to exit a respirator's interior gas space;

"exhaled air" is air that is exhaled by a respirator wearer;

"exterior gas space" means the ambient atmospheric gas space into which exhaled gas enters after passing through and beyond the mask body and/or exhalation valve;

"filter" or "filtration layer" means one or more layers of material, which layer(s) is adapted for the primary purpose of removing contaminants (such as particles) from an air stream that passes through it;

"film" means a thin sheet-like structure;

"filter media" means an air-permeable structure that is designed to remove contaminants from air that passes through it;

"flap" means a sheet-like article that is designed to open and close during valve operation;

"flashing" means an alteration in visible light that occurs quickly in transient fashion to be readily noticeable to the human eye; flashing is characterized according to the Flashing Test set forth below;

"flexible flap" means a sheet-like article that is capable of bending or flexing in response to a force exerted from an exhale gas stream;

"harness" means a structure or combination of parts that assists in supporting the mask body on a wearer's face;

"interior gas space" means the space between a mask body and a person's face;

"mask body" means an air-permeable structure that can fit at least over the nose and mouth of a person and that helps define an interior gas space separated from an exterior gas space;

"major surface" means a surface that has a substantially larger surface area than other surfaces (but not all surfaces) in the article or body;

"multiple" means more than 5;

"optical film" means a film that specularly reflects a portion of the visible spectrum at some viewing angle;

"outer surface" with respect to the flap means the major surface that faces away from the seal surface when the flap is in engagement with the valve seat;

"plurality" means two or more;

"respirator" means a device that is worn by a person to provide clean air for the wearer to breathe;

"transparent" means that visible light can pass therethrough sufficiently to enable the desired image on the opposing side of the structure (valve cover) modified by the word "transparent";

"thin" means having a thickness of less than 200 micrometers; and

"valve seat" or "valve base" means the solid part of a valve that has an orifice for a fluid to pass through and that is disposed adjacent to or in contact with the substrate or article to which it is mounted.

DETAILED DESCRIPTION OF PREFERRED EMBODIMENTS

Figure 1:
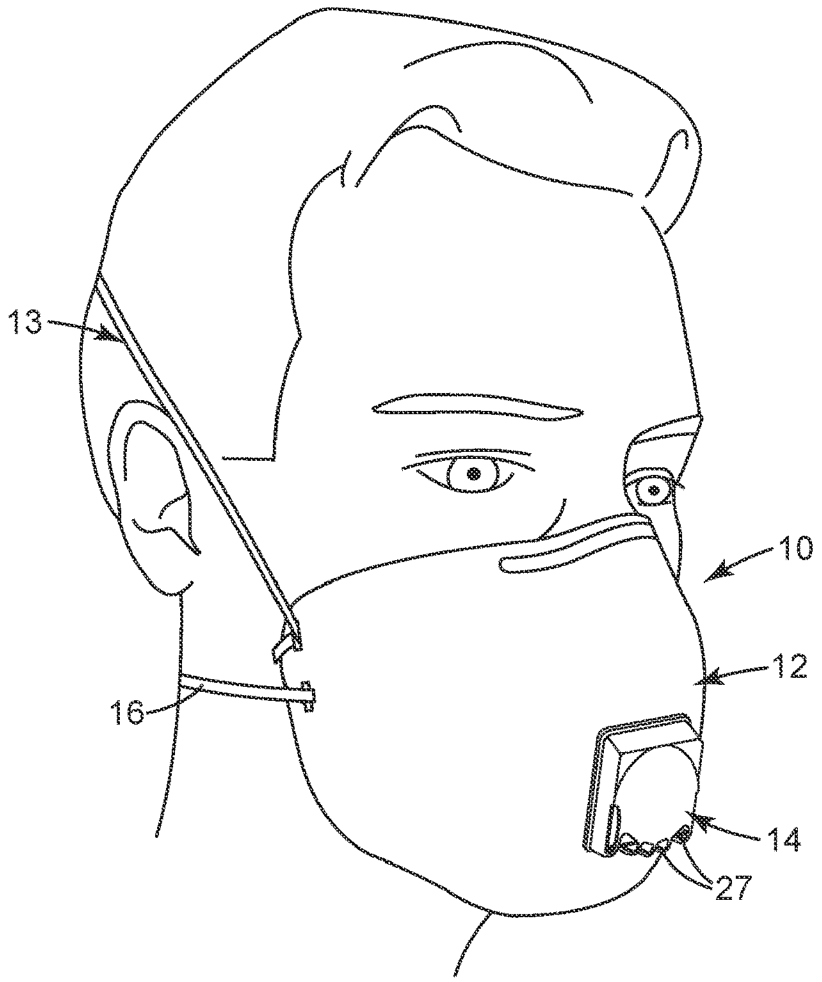
FIG. 1 is a perspective view of a respirator 10, which exhibits flashes according to the present disclosure.

FIG. 1 illustrates an example of a filtering face mask 10 that may be used in conjunction with the present disclosure. Filtering face mask 10 is a half mask (because it covers the nose and mouth but not the eyes) that has a cup-shaped mask body 12 onto which a harness 13 and an exhalation valve 14 are attached. The exhalation valve 14 can be secured to the mask body 12 using a variety of techniques such as ultrasonic welding, gluing, adhesively bonding (see U.S. Pat. No. 6,125,849 to Williams et al.), or mechanical clamping (see U.S. Pat. No. 7,069,931 to Curran et al.). The mask body 12 is adapted to fit over the nose and mouth of a person in spaced relation to the wearer's face to create an interior gas space or void between the wearer's face and the interior surface of the mask body. The illustrated mask body 12 is fluid permeable and typically is provided with an opening (not shown) that is located where the exhalation valve 14 is attached to the mask body 12 so that exhaled air can exit the interior gas space through the valve 14 without having to pass through the mask body itself. The preferred location of the opening on the mask body 12 is directly in front of where the wearer's mouth would be when the mask is being worn. The placement of the opening, and hence the exhalation valve 14, at this location allows the valve to open more easily in response to the force or momentum from the exhale flow stream. For a mask body 12 of the type shown in FIG. 1, essentially the entire exposed surface of mask body 12 is fluid permeable to inhaled air. The exhalation valve 14 opens in response to increased pressure inside the mask 10, which increased pressure occurs when a wearer exhales. The exhalation valve 14 preferably remains closed between breaths and during an inhalation. To hold the face mask snugly upon the wearer's face, the harness 13 can include straps 16, tie strings, or any other suitable means attached to it for supporting the mask body 12 on the wearer's face. Examples of mask harnesses that may be used in connection with the present disclosure are shown in U.S. Pat. Nos. 6,457,473B1, 6,062,221, and 5,394,568 to Brostrom et al.; U.S. Pat. No. 6,332,465B1 to Xue et al.; U.S. Pat. Nos. 6,119,692 and 5,464,010 to Byram; and U.S. Pat. Nos. 6,095,143 and 5,819,731 to Dyrud et al.

Figure 2:
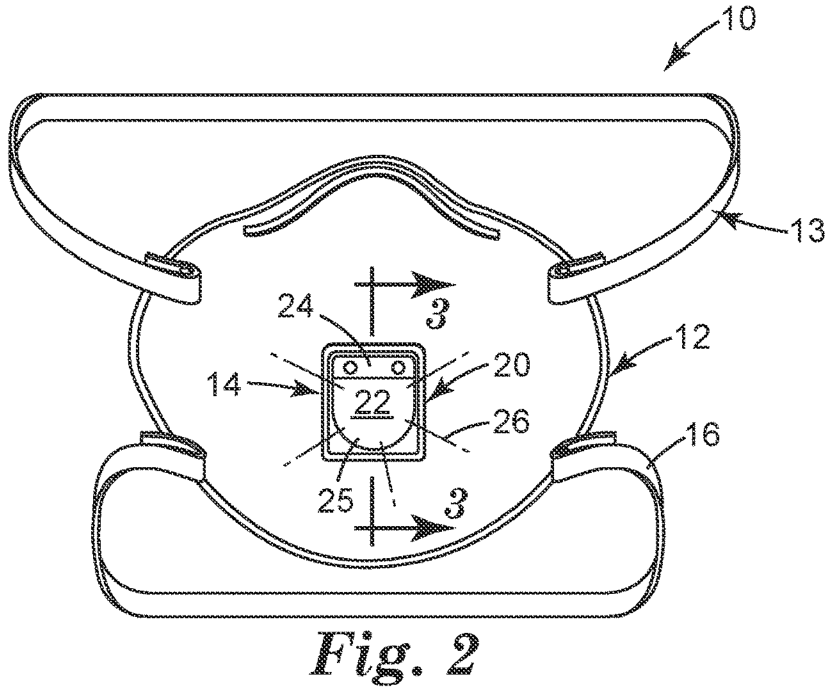
FIG. 2 is a front view of a respirator 10 that has a mask body 12 onto which an exhalation valve 14, having an optical film flap 22 in accordance with the present disclosure, is disposed.

FIG. 2 shows that the valve 14 has a valve seat 20 onto which a flap 22 is secured at stationary portion 24. The flap 22 can be a flexible flap that has a free portion 25 that lifts from the valve seat 20 during an exhalation. When the valve opens and closes, it displays a visual flashing 26 that may be seen by coworkers or the wearer when looking in a mirror. Different colors also may be displayed when the flap is viewed at different angles, which may add to the visual affect. The valve may, for example, display a blue color at a first angle and a yellow color at a second angle, or the color change may be from red to green or vice versa. When the free portion 25 of the flap 22 is not in contact with the valve seat 20, exhaled air may pass from the interior gas space to an exterior gas space. The flap may display a different color at this location than at the closed position where the flap is in contact with the valve seat. The exhaled air may pass directly into the exterior gas space through openings 27 (FIGS. 1 and 7) in the valve cover when the flap is open. The mask body 12 can have a curved, hemispherical shape as shown in FIGS. 1 and 2 (see also U.S. Pat. No. 4,807,619 to Dyrud et al.), or it may take on other shapes as so desired. For example, the mask body can be a cup-shaped mask having a construction like the face mask disclosed in U.S. Pat. No. 4,827,924 to Japuntich. The mask also could have the three-fold configuration that can fold flat when not in use but can open into a cup-shaped configuration when worn. See U.S. Pat. Nos. 6,484,722B2 and 6,123,077 to Bostock et al., U.S. Design Pat. Nos. Des. 431,647 to Henderson et al., and Des. 424,688 to Bryant et al. Face masks of the disclosure also may take on many other configurations, such as flat bifold masks disclosed, e.g., in U.S. Design Pat. Nos. Des. 448,472S and Des. 443,927S to Chen. The mask body also could be fluid impermeable and could have filter cartridges attached to it like, for example, the masks shown in U.S. Pat. No. 6,277,178B1 to Holmquist-Brown et al. or in U.S. Pat. No. 5,062,421 to Burns and Reischel. In addition, the mask body also could be adapted for use with a positive pressure air intake as opposed to the negative pressure masks just mentioned. Examples of positive pressure masks are shown in U.S. Pat. No. 6,186,140 B1 to Hoague, U.S. Pat. No. 5,924,420 to Grannis et al., and U.S. Pat. No. 4,790,306 to Braun et al. These masks may be connected to a powered air purifying respirator body that would be worn around the waist of the user. See, e.g., U.S. Design Pat. D464,725 to Petherbridge et al. The mask body of the filtering face mask also could be connected to a self-contained breathing apparatus, which may supply clean air to the wearer as disclosed, for example, in U.S. Pat. Nos. 5,035,239 and 4,971,052. The mask body may be configured to cover not only the nose and mouth of a wearer (referred to as a "half mask") but may also cover the eyes as well (referred to as a "full face mask") to provide protection to a wearer's vision in addition to the wearer's respiratory system. See, e.g., U.S. Pat. No. 5,924,420 to Reischel et al.

The mask body may be spaced from the wearer's face, or it may reside flush or in close proximity to it. In either instance, the mask helps define an interior gas space into which exhaled air passes before leaving the mask interior through the exhalation valve. The mask body also could have a thermochromic fit-indicating seal at its periphery to allow the wearer to easily ascertain if a proper fit has been established. See U.S. Pat. No. 5,617,849 to Springett et al.

Figure 3:
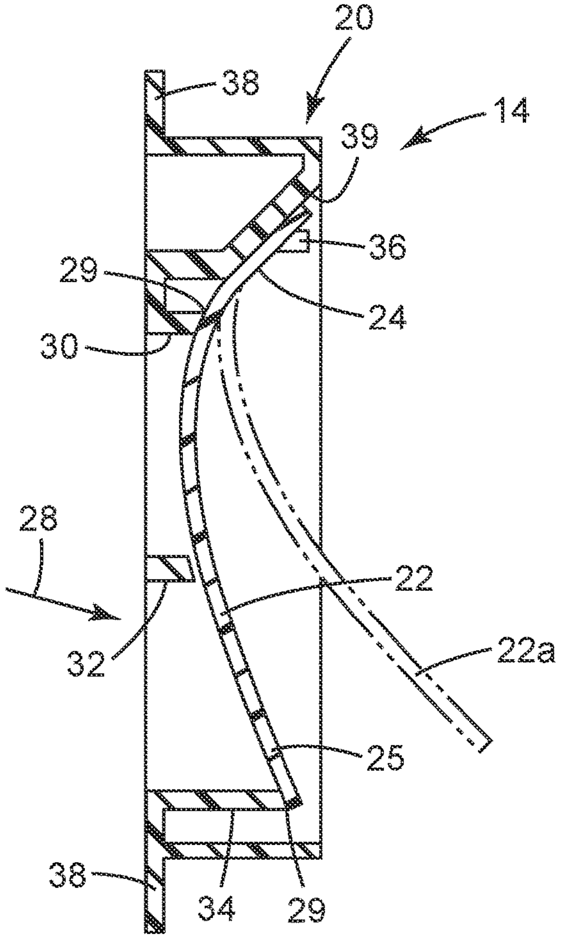
FIG. 3 is a cross-sectional side view of the exhalation valve 14 of FIG. 1.

FIG. 3 shows the flexible flap 22 in a closed position, resting on seal surface 29, and in an open position, lifted away from surface 29 as represented by dotted line **22*a*. A fluid passes through the valve 14 in the general direction indicated by arrow 28, representing an exhale flow stream. The fluid that passes through the valve orifice exerts a force on the flexible flap 22 (or transfers its momentum to it), causing the free portion 25 of flap 22 to be lifted from seal surface 29 to make the valve 14 open. The valve 14 is preferably oriented on face mask 10 such that the free portion 25 of flexible flap 22 is located below the stationary portion 24 when the mask 10 is positioned upright as shown in FIG. 1. This enables exhaled air to be deflected downwards to prevent moisture from condensing on the wearer's eyewear. The movement of the valve causes the valve to flash to a person looking at the valve. The flexible flap 22** has at least an outer surface that includes a material that creates the flashing image to a viewer. When the flap moves from an open position to a closed position, the flap takes on a different orientation to the viewer. The different orientation creates a different angle of reflection with respect to the ambient light. The quickly changing angle of reflection creates a flash and/or color change to the viewer. To cause the flashing, the flap may include, for example, an optical film or reflective material on the outer surface of the flap. Examples of reflective materials include metalized surfaces such as a metalized polymeric film such as a MYLAR™ film available from DuPont. The optical film layer also may include a specularly reflective set of film layers that include many layers having different refractive indices. Optical film layers suitable for use in the present disclosure are described herein in more detail.

Figure 4:
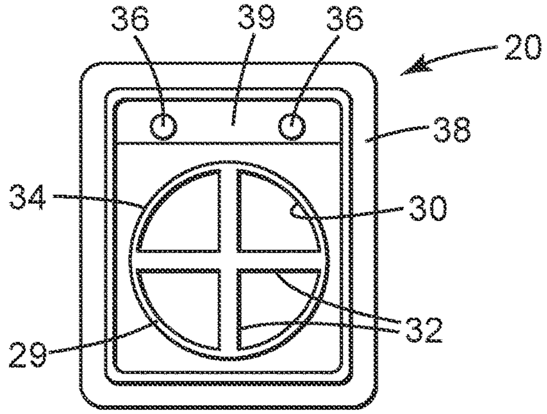
FIG. 4 is a front view of a valve seat 20 for the valve 14 shown in FIG. 2.

FIG. 4 shows the valve seat 20 from a front view without a flap being attached to it. The valve orifice 30 is disposed radially inward from the seal surface 29 and can have cross members 32 that stabilize the seal surface 29 and ultimately the valve 14. The cross members 32 also can prevent flexible flap 22 (FIG. 2) from inverting into the orifice 30 during a strong inhalation. Moisture build-up on the cross members 32 can hamper the opening of the flap 22. Therefore, the surfaces of the cross-members 32 that face the flap may be slightly recessed beneath the seal surface 29. The seal surface 29 circumscribes or surrounds the orifice 30 to preclude passage of contaminates through the orifice when the valve is closed. Seal surface 29 and the valve orifice 30 can take on essentially any shape when viewed from the front. For example, the seal surface 29 and the orifice 30 may be square, rectangular, circular, elliptical, etc. The shape of seal surface 29 does not have to correspond to the shape of orifice 30 or vice versa. For example, the orifice 30 may be circular and the seal surface 29 may be rectangular. The seal surface 29 and orifice 30, however, may have a circular cross-section when viewed against the direction of fluid flow. The valve seat 20 also may have alignment pins 36 that are provided to ensure that the flap is properly aligned on the valve seat during use. The optical film portion of the flexible flap, if partially light transmissive, may reflect different colors based on the color and proximity to the cross members and valve seat (for example, white, black, or metalized cross members/valve seat) or an underlying non-transmissive material. A mounting flange 38 can be disposed at the valve base for mounting of the valve to a mask body. A flap retaining surface 39 is located where the stationary portion of the flap is mounted to the valve seat 20.

The majority of the valve seat 20 is typically made from a relatively lightweight plastic that is molded into an integral one-piece body using, for example, injection molding techniques and the resilient seal surface 29 can be joined to it. The seal surface 29 that makes contact with the flexible flap 22 can be fashioned to be substantially uniformly smooth to ensure that a good seal occurs. The seal surface 29 may reside on the top of a seal ridge 34 (FIG. 3) or it may be in planar alignment with the valve seat itself. The contact area of the seal surface 29 may have a width great enough to form a seal with the flexible flap 22 but is not so wide as to allow adhesive forces caused by condensed moisture or expelled saliva—to make the flexible flap 22 significantly more difficult to open. The contact area of the seal surface 29 can be curved in a concave manner where the flap 22 makes contact with the seal surface to facilitate contact of the flap to the seal surface around the whole seal surface perimeter. The valve 14 and its valve seat 20 are more fully described in U.S. Pat. Nos. 5,509,436 and 5,325,892 to Japuntich et al. An exhalation valve that has an elastomeric seal surface is described in U.S. Pat. No. 7,188,622 to Martin et al. Such a seal surface can be particularly useful when using a relatively stiff flap material like the optical films described herein.

Figure 5:
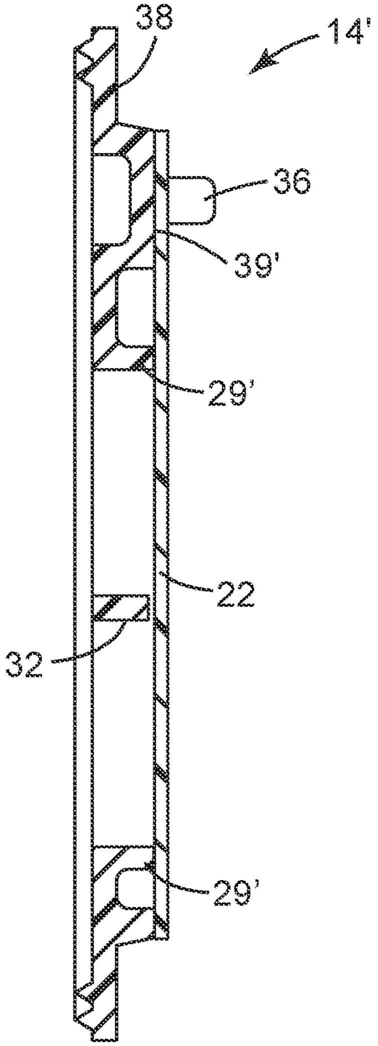
FIG. 5 is a cross-sectional side view of an alternative embodiment of an exhalation valve 14' in accordance with the present disclosure.

FIG. 5 shows another embodiment of an exhalation valve 14'. Unlike the embodiment shown in FIG. 2, this exhalation valve 14' has, when viewed from a side elevation, a planar seal surface 29' that is in alignment with the flap-retaining surface 39'. The flap shown in FIG. 5 thus is not pressed towards or against the seal surface 29' by virtue of any mechanical force or internal stress that is placed on the flexible flap 22. Because the flap 22 is not preloaded or biased towards the seal surface 29' under "neutral conditions"—that is, when no fluid is passing through the valve and the flap is not otherwise subjected to external forces other than gravity—the flap 22 can open more easily during an exhalation. When using an optical film in accordance with the present disclosure, it may not be necessary to have the flap biased or forced into contact with the seal surface 29'—although such a construction may be desired in some instances. The optical films may allow for the use of a flexible flap that is stiffer than flaps on known commercial products. The flap may be so stiff that it does not significantly droop away from the seal surface 29' in an unbiased condition when the force of gravity is per se exerted upon the flap and the valve is oriented such that the flap is disposed below the seal surface. The exhalation valve 14' shown in FIG. 5, therefore, can be fashioned so that the flap 22 makes good contact with the seal surface under any orientation, including when a wearer bends their head downward towards the floor, without having the flap biased (or substantially biased) towards the seal surface. A stiff flap, therefore, may make hermetic-type contact with the seal surface 29' under any orientation of the valve with very little or no pre-stress or bias towards the valve seat's seal surface. The lack of significant predefined stress or force on the flap, to ensure that it is pressed against the seal surface during valve closure under neutral conditions, can enable the flap to open more easily during an exhalation and hence can reduce the power needed to operate the valve while breathing. Sealing to the seal surface may be further improved through use of a resilient seal surface. See, e.g., U.S. Pat. No. 7,188,622 to Martin et al.

Figure 6:
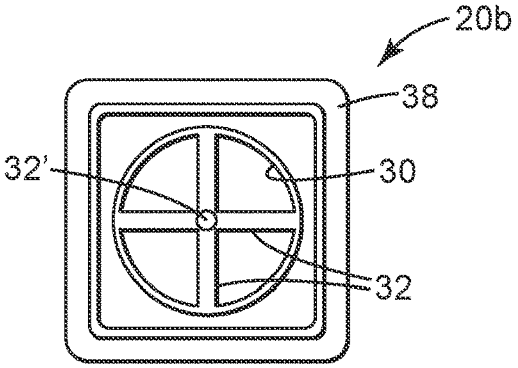
FIG. 6 is a front view of a valve seat **20*b*** for a button-style exhalation valve.

FIG. 6 shows a valve seat **20*b* that is suitable for use in connection with button valves of the present disclosure. Unlike the valve seat 20 (FIG. 4) that is fashioned for use in connection with cantilevered valve flaps, the valve seat 20*b* has the flexible flap mounted centrally at location 32'**. This enables essentially any portion of the perimeter of the flap to be lifted from the seal surface during an exhalation. In cantilevered flaps, the end of the flap that is opposite the stationary portion is the part of the flap that lifts from the seal surface during an exhalation. In contrast, in a button-style valve, any portion of that circumference may be lifted from the seal surface during an exhalation. The present disclosure also may be used in conjunction with butterfly style valves as well. See, e.g., U.S. Pat. No. 4,934,362 to Braun.

Figure 7:
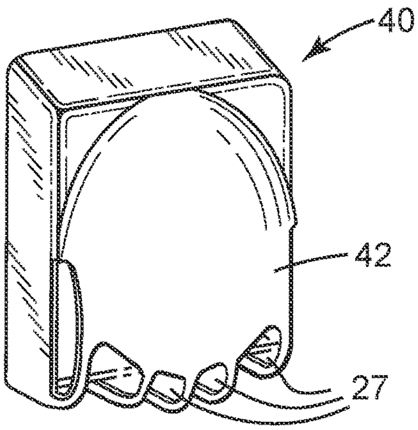
FIG. 7 is a perspective view of a valve cover 40 that may be used with an exhalation valve in accordance with the present disclosure.

FIG. 7 shows a valve cover 40 that may be suitable for use in connection with the exhalation valves described herein. The valve cover 40 defines an internal chamber into which the flexible flap can move from its closed position to its open position. The valve cover 40 can protect the flexible flap from damage and can assist in directing exhaled air downward away from a wearer's eyeglasses. As shown, the valve cover 40 may possess a plurality of openings 27 to allow exhaled air to escape from the internal chamber defined by the valve cover 40. Air that exits the internal chamber through the openings 27 enters the exterior gas space, e.g., downwardly away from a wearer's eyewear. The valve cover 40 can be secured to the valve seat using a variety of techniques, including friction, clamping, gluing, adhesively bonding, welding, etc. In one or more embodiments, the valve cover is transparent, at least on its top surface 42 to allow the internal flashing flap to be more easily seen.

The flexible flap that is used in connection with the present disclosure may reflect light of a different color or intensity when viewed from a different angle. When the flap opens and closes, the angle at which a stationary object or person views the flap is different. This difference in angular perception of the outer surface of the flap causes light of a different color or intensity to be seen by a person watching the flap open and close. The one or more materials that cause the flap to flash when moving from an open position to a closed position or vice versa may be placed on the outer surface of the flap as a film. Alternatively, the whole flap may be made of or include the material(s) that cause the flap to flash. If the material that causes the flap to flash is a relatively stiff material, the underlying flap material may be made from a material that has a lower modulus of elasticity than the material responsible for causing the flap to flash. The underlying layer would contact the seal surface of the valve seat when the flap is closed. The lower modulus of elasticity can help provide a leak free contact when the valve is in its closed position. The modulus of elasticity of the layer that contacts the seal surface may be about 0.15 to 10 Mega Pascals (MPa), or more typically 1 to 7 MPa, when using a conventionally-rigid valve seat material such as a hard plastic. U.S. Pat. No. 7,028,689 to Martin et al.

describes the use of a multilayered flap where the layer that contacts the seal surface has a lower modulus of elasticity than the layers positioned thereabove. If the whole flap is made from relatively stiff materials, then a resilient seal surface material may be used on the valve seat to improve flap sealing. See U.S. Pat. No. 7,188,622 to Martin et al. The resilient seal surface may have a hardness of less than 0.015 Giga Pascals (GPa), or more typically less than 0.013 GPa. In one or more embodiments, the flap may be caused to flash during opening and closing through use of a band shifting film.

The band shifting film may include a multilayer polymeric film that acts as a colored mirror or polarizer. The layers of the film may include alternating layers of first and second polymers that provide a multilayer birefringent band shifting film. Multilayer birefringent band shifting films that have particular relationships between the refractive indices of successive layers for light polarized along mutually orthogonal in-plane axes (the x-axis and the y-axis) and along an axis perpendicular to the in-plane axes (the z-axis) may be used. In one or more embodiments, the differences in refractive indices along the x-, y-, and z-axes ($\Delta x$, $\Delta y$, and $\Delta z$, respectively) are such that the absolute value of $\Delta z$ is less than about one tenth the absolute value of at least one of $\Delta x$ or $\Delta y$ (e.g., ($|\Delta z|<0.1k$, $k=\max\{|\Delta x|, |\Delta y|\}$). Films having this property can be made to exhibit transmission spectra in which the widths and intensities of the transmission or reflection peaks (when plotted as a function of frequency, or $1/\lambda$) for p-polarized light remain essentially constant over a wide range of viewing angles. Also for p-polarized light, the spectral features shift toward the blue region of the spectrum at a higher rate with angle change than the spectral features of isotropic thin film stacks.

The band shifting films suitable for use in the present disclosure can be optically-anisotropic, multilayer polymer films that change color as a function of viewing angle. These films, which may be designed to reflect one or both polarizations of light over at least one bandwidth, can be tailored to exhibit a sharp band edge at one or both sides of at least one reflective bandwidth, thereby giving a high degree of color saturation at acute angles. The layer thicknesses and indices of refraction of the optical stacks within the band shifting films of the present disclosure may be controlled to reflect at least one polarization of specific wavelengths of light (at a particular angle of incidence) while being transparent over other wavelengths. Through careful manipulation of these layer thicknesses and indices of refraction along the various film axes, the films may be made to behave as mirrors or polarizers over one or more regions of the spectrum. Thus, for example, the films may be tuned to reflect both polarizations of light in the IR region or a visible portion of the spectrum while being transparent over other portions of the spectrum. In addition to high reflectivities, the films also may have a shape (e.g., the bandwidth and reflectivity values) of the optical transmission/reflection spectrum of the multilayer film for p-polarized light that remains essentially unchanged over a wide range of angles of incidence. Because of this feature, a mirror film having a narrow transmission band at, for example, 650 nm can appear deep red in transmission at normal incidence, then red, yellow, green, and blue at successively higher angles of incidence. Such behavior is analogous to moving a color dispersed beam of light across a slit in a spectrophotometer.

Figure 8:
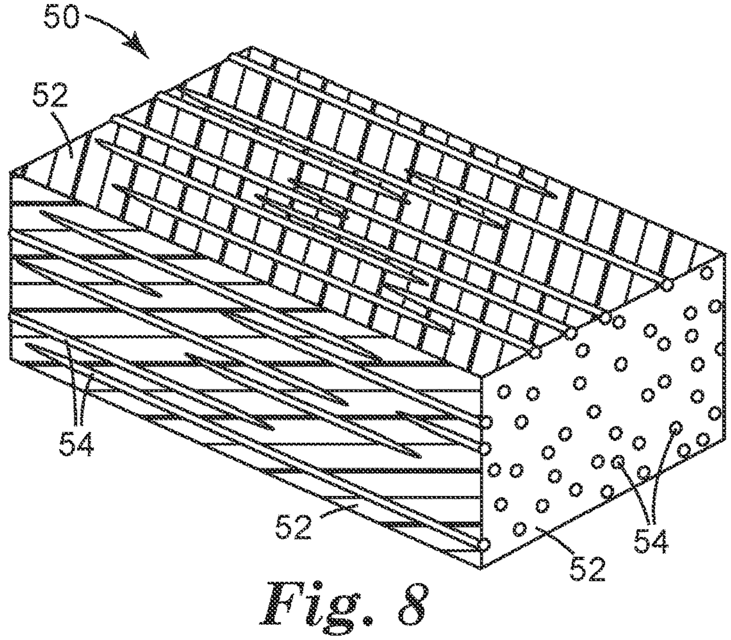
FIG. 8 is a schematic perspective view of a first embodiment of an optical body 50 suitable for use in a flexible flap of the present disclosure.
Figure 9:
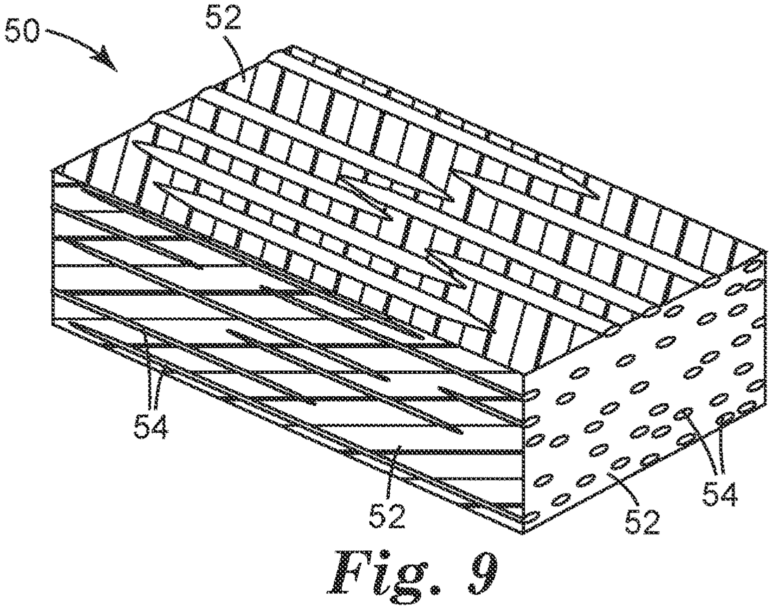
FIG. 9 is a schematic perspective view of a second embodiment of optical body 50 suitable for use in a flexible flap of the present disclosure.

Any suitable optical films can be utilized with the valves of the present disclosure. For example, FIGS. 8-9 illustrate a diffusely reflective optical film 50 or other optical body that includes a birefringent matrix or continuous phase 52 and a discontinuous or disperse phase 54. The birefringence of the continuous phase is typically at least about 0.05, more typically at least about 0.1, still more typically at least about 0.15, and yet more typically at least about 0.2.

For a polarizing optical film, the indices of refraction of the continuous and disperse phases are substantially matched (i.e., differ by less than about 0.05) along a first of three mutually orthogonal axes, and are substantially mismatched (i.e., differ by more than about 0.05) along a second of three mutually orthogonal axes. Typically, the indices of refraction of the continuous and disperse phases differ by less than about 0.03 in the match direction, more preferably, less than about 0.02, and most preferably, less than about 0.01. The indices of refraction of the continuous and disperse phases typically differ in the mismatch direction by at least about 0.07, more typically, by at least about 0.1, and most preferably, by at least about 0.2.

The mismatch in refractive indices along a particular axis has the effect that incident light polarized along that axis will be substantially scattered, resulting in a significant amount of reflection. By contrast, incident light polarized along an axis in which the refractive indices are matched will be spectrally transmitted or reflected with a much lesser degree of scattering. This effect can be utilized to make a variety of optical devices, including reflective polarizers and mirrors.

The present disclosure provides a practical and simple optical body and method for making a reflective polarizer, and also provides a means of obtaining a continuous range of optical properties according to the principles described herein. Also, very efficient low loss polarizers can be obtained with high extinction ratios. Other advantages are a wide range of practical materials for the disperse phase and the continuous phase, and a high degree of control in providing optical bodies of consistent and predictable high quality performance. The materials of at least one of the continuous and disperse phases are of a type that undergoes a change in refractive index upon orientation. Consequently, as the film is oriented in one or more directions, refractive index matches or mismatches are produced along one or more axes. By careful manipulation of orientation parameters and other processing conditions, the positive or negative birefringence of the matrix can be used to induce diffuse reflection or transmission of one or both polarizations of light along a given axis. The relative ratio between transmission and diffuse reflection is dependent on the concentration of the disperse phase inclusions, the thickness of the film, the square of the difference in the index of refraction between the continuous and disperse phases, the size and geometry of the disperse phase inclusions, and the wavelength or wavelength band of the incident radiation. The magnitude of the index match or mismatch along a particular axis directly affects the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby transmitted specularly through the volume of the body.

Figure 10:
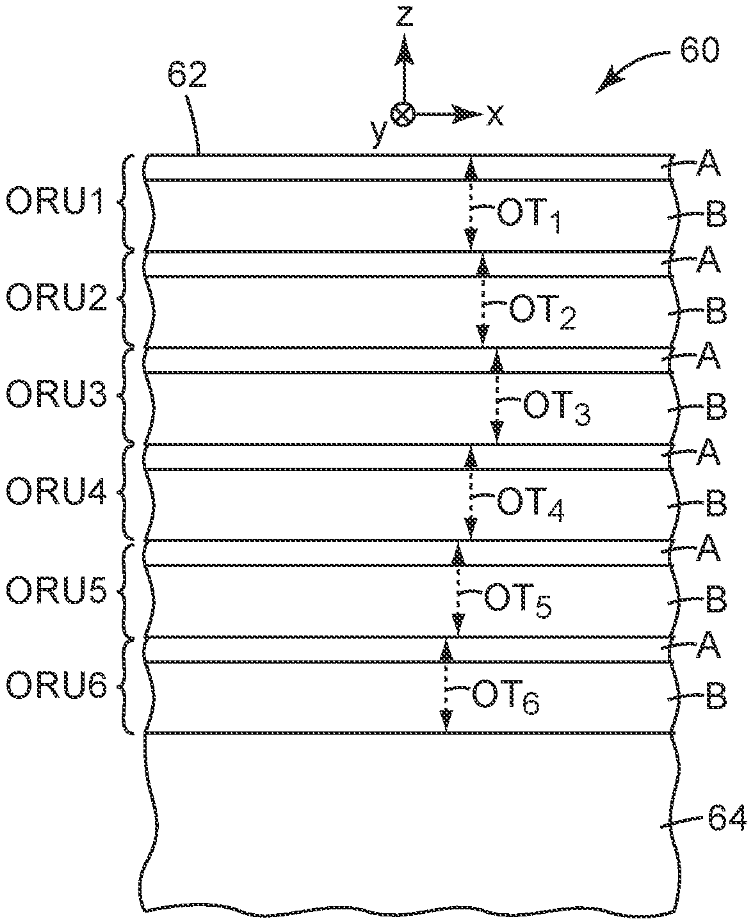
FIG. 10 is a schematic side view of a portion of a multilayer optical film 60 suitable for use in a flexible flap of the present disclosure.

FIG. 10 shows a portion of one embodiment of a multilayer optical film 60 in schematic side view to reveal the structure of the film including its interior layers. The film is shown in relation to a local x-y-z Cartesian coordinate system, where the film extends parallel to the x- and y-axes, and the z-axis is perpendicular to the film and its constituent layers and parallel to a thickness axis of the film. Note that the film 60 need not be entirely flat, but may be curved or otherwise shaped to deviate from a plane, and even in those cases arbitrarily small portions or regions of the film can be associated with a local Cartesian coordinate system as shown.

Multilayer optical films can include individual layers having different refractive indices so that some light is reflected at interfaces between adjacent layers. These layers, sometimes referred to as "microlayers," are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 10, the microlayers are labeled "A" or "B", the "A" layers being composed of one material and the "B" layers being composed of a different material, these layers being stacked in an alternating arrangement to form optical repeat units (ORUs) or unit cells ORU 1, ORU 2, . . . ORU 6 as shown. Typically, a multilayer optical film composed entirely of polymeric materials would include many more than 6 optical repeat units if high reflectivities are desired. Note that all of the "A" and "B" microlayers are interior layers of film 60, except for the uppermost "A" layer whose upper surface in this illustrative example coincides with the outer surface 62 of the film 60. The substantially thicker layer 64 at the bottom of the figure can represent an outer skin layer, or a PBL that separates the stack of microlayers shown in the figure from another stack or packet of microlayers (not shown). If desired, two or more separate multilayer optical films can be laminated together, e.g., with one or more thick adhesive layers, or using pressure, heat, or other techniques to form a laminate or composite film.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. In the embodiment of FIG. 10, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness. The reflectivity provided by microlayer stacks or packets used in multilayer optical films in general, and in the internally patterned multilayer films discussed herein in particular, is typically substantially specular in nature, rather than diffuse, as a result of the generally smooth well-defined interfaces between microlayers, and the low haze materials that are used in a typical construction. In some cases, however, the finished article may be tailored to incorporate any desired degree of scattering, e.g., using a diffuse material in skin layer(s) and/or PBL layer(s), and/or using one or more surface diffusive structures or textured surfaces, for example.

In some embodiments, the optical thicknesses of the optical repeat units in a layer stack may all be equal to each other, to provide a narrow reflection band of high reflectivity centered at a wavelength equal to twice the optical thickness of each optical repeat unit. In other embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, e.g., as discussed in U.S. Pat. No. 6,157,490 (Wheatley et al.) entitled OPTICAL FILM WITH SHARPENED BANDEDGE. For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) entitled INFRARED REFLECTIVE OPTICAL INTERFERENCE FILM; U.S. Pat. No. 5,360,659 (Arends et al.) entitled TWO COMPONENT INFRARED REFLECTING FILM; U.S. Pat. No. 6,207,260 (Wheatley et al.) entitled MULTICOMPONENT OPTICAL BODY; and U.S. Pat. No. 7,019,905 (Weber) entitled MULTI-LAYER REFLECTOR WITH SUPPRESSION OF HIGH ORDER REFLECTIONS.

As mentioned herein, adjacent microlayers of the multilayer optical film have different refractive indices so that some light is reflected at interfaces between adjacent layers. We refer to the refractive indices of one of the microlayers (e.g. the "A" layers in FIG. 10) for light polarized along principal x-, y-, and z-axes as n1x, n1y, and n1z, respectively. The x-, y-, and z-axes may, for example, correspond to the principal directions of the dielectric tensor of the material. Typically, and for discussion purposes, the principle directions of the different materials are coincident, but this need not be the case in general. We refer to the refractive indices of the adjacent microlayer (e.g. the "B" layers in FIG. 10) along the same axes as n2x, n2y, n2z, respectively. We refer to the differences in refractive index between these layers as Δnx (=n1x−n2x) along the x-direction, Δny (=n1y−n2y) along the y-direction, and Δnz (=n1z−n2z) along the z-direction. The nature of these refractive index differences, in combination with the number of microlayers in the film (or in a given stack of the film) and their thickness distribution, controls the reflective and transmissive characteristics of the film (or of the given stack of the film) in a given zone. For example, if adjacent microlayers have a large refractive index mismatch along one in-plane direction (Δnx large) and a small refractive index mismatch along the orthogonal in-plane direction (Δny≈0), the film or packet may behave as a reflective polarizer for normally incident light. In this regard, a reflective polarizer may be considered for purposes of this disclosure to be an optical body that strongly reflects normally incident light that is polarized along one in-plane axis (referred to as the "block axis") if the wavelength is within the reflection band of the packet, and strongly transmits such light that is polarized along an orthogonal in-plane axis (referred to as the "pass axis"). "Strongly reflects" and "strongly transmits" may have different meanings depending on the intended application or field of use, but in many cases a reflective polarizer will have at least 70, 80, or 90% reflectivity for the block axis, and at least 70, 80, or 90% transmission for the pass axis. A material may be considered to be "birefringent" when the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., n1x, n1y, n1z) are not all the same. Adjacent microlayers may have a large refractive index mismatch along both in-plane axes (Δnx large and Δny large), in which case the film or packet may behave as an on-axis mirror. In this regard, a mirror or mirror-like film may be considered for purposes of this application to be an optical body that strongly reflects normally incident light of any polarization if the wavelength is within the reflection band of the packet. "Strongly reflecting" may have different meanings depending on the intended application or field of use, but in many cases a mirror will have at least 70, 80, or 90% reflectivity for normally incident light of any polarization at the wavelength of interest. In variations of the foregoing embodiments, the adjacent microlayers may exhibit a refractive index match or mismatch along the z-axis (Δnz≈0 or Δnz large), and the mismatch may be of the same or opposite polarity or sign as the in-plane refractive index mismatch(es). Such tailoring of Δnz plays a key role in whether the reflectivity of the p-polarized component of obliquely incident light increases, decreases, or remains the same with increasing incidence angle. In yet another example, adjacent microlayers may have a substantial refractive index match along both in-plane axes (Δnx≈Δny 0) but a refractive index mismatch along the z-axis (Δnz large), in which case the film or packet may behave as a so-called "p-polarizer," strongly transmitting normally incident light of any polarization, but increasingly reflecting p-polarized light of increasing incidence angle if the wavelength is within the reflection band of the packet.

In view of the large number of permutations of possible refractive index differences along the different axes, the total number of layers and their thickness distribution(s), and the number and type of microlayer packets included in the multilayer optical film, the variety of possible multilayer optical films 60 and packets thereof is vast. Some of the microlayers in at least one packet of the multilayer optical film are birefringent in at least one zone of the film. Thus, a first layer in the optical repeat units may be birefringent (i.e., n1x≠n1y, or n1x≠n1z, or n1y≠n1z), or a second layer in the optical repeat units may be birefringent (i.e., n2x≠n2y, or n2x≠n2z, or n2y≠n2z), or both the first and second layers may be birefringent. Further, the birefringence of one or more such layers may be diminished in at least one zone relative to a neighboring zone. In some cases, the birefringence of these layers may be diminished to zero, such that they are optically isotropic (i.e., n1x=n1y=n1z, or n2x=n2y=n2z) in one of the zones but birefringent in a neighboring zone. In cases where both layers are initially birefringent, depending on materials selection and processing conditions, they can be processed in such a way that the birefringence of only one of the layers is substantially diminished, or the birefringence of both layers may be diminished.

Examples of multilayer optical films that may be suitable for use in the present disclosure are disclosed in U.S. Pat. Nos. 5,217,794 and 5,486,949 to Schrenk et al.; U.S. Pat. No. 5,825,543 to Ouderkirk et al.; U.S. Pat. Nos. 5,882,774, 6,045,894, and 6,737,154 to Jonza et al.; U.S. Pat. Nos. 6,179,948, 6,939,499, and 7,316,558 to Merrill et al.; U.S. Pat. No. 6,531,230 to Weber et al.; U.S. Pat. No. 7,256,936 to Hebrink et al.; and U.S. Pat. No. 6,506,480 to Liu et al. See also U.S. Patent Publication Nos. 2011/0255163 to Merrill et al.; and 2013/0095435 to Dunn et al. In one or more embodiments, the optical films of the present disclosure can include a color shifting film that includes a reflective stack disposed on a support, where the stack includes an at least partially transparent spacer layer disposed between a partially reflective first layer and a reflective second layer as described, e.g., in U.S. Pat. No. 8,120,854 to Endle et al. entitled INTERFERENCE FILMS HAVING ACRYLAMIDE LAYER AND METHOD OF MAKING SAME.

Multilayer optical films suitable for use in the disclosure may be made according to techniques discussed in the patents cited herein. The optical films also can be fabricated using coextruding, casting, and orienting processes. See, e.g., U.S. Pat. No. 5,882,774 to Jonza et al. entitled OPTICAL FILM; U.S. Pat. No. 6,179,949 to Merrill et al. entitled OPTICAL FILM AND PROCESS FOR MANUFACTURE THEREOF; and U.S. Pat. No. 6,783,349 to Neavin et al. entitled APPARATUS FOR MAKING MULTILAYER OPTICAL FILMS. The multilayer optical film may be formed by coextrusion of the polymers as described in any of the aforementioned references. The polymers of the various layers can be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

Figure 11:
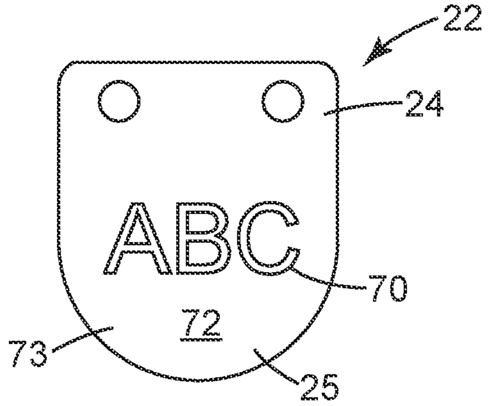
FIG. 11 is a front view of a flexible flap 22 that may be used in connection with the present disclosure and that has indicia 70 disposed on a front surface 72 thereof; and FIGS. **12*a*-12*c*** illustrate spectral measurements for the flexible flap film of Example 3.

FIG. 11 shows a flexible flap 22 that may be made from a flashing optical film like those described herein. In this instance, the optical film is tailored to provide visible indicia 70 on an outer surface 72 of the free portion 25 of the flap 22. The indicia 70 may be fashioned to display the trademark or brand of the manufacturer of the flap or the trademark or brand of the valve itself. Alternatively, the indicia 70 could be an image of an object or animal, for example, an airplane or eagle. The indicia 70 can be fashioned so that product counterfeiting can be easily detected. The optical film can be made from hundreds or thousands of layers of alternating refractive index layers. In tailoring the alteration of these layers at the indicia 70 to display a color different from the color of the outer surface 72, the tailoring can be adapted so that only those knowing of the particular alteration beforehand can identify it in the final product. The tailoring of the indicia 70 can, therefore, serve as an identifier for counterfeiting. An alteration to the intrinsic structure of the indicia area or zone can be provided that causes the indicia area to reflect or display light of a noticeably different color to a person viewing both the indicia 70 and the surrounding area 73 on the outer surface 72. The flexible flap may be made from alternating layers of different refractive indexes. These alternating layers can create a constructive interference between the internal surfaces in the film. The film can be stretched to create a molecular orientation that raises the refractive index of the higher refractive index material, which is referred to as the development of birefringence. The oriented material has a larger index of refraction, which can cause a higher reflectivity. The higher index layer can be returned to a lower refractive index by a melting process. The melting may be achieved through use of a laser. Thus, precise changes to the intrinsic structure of the film may be carried out, which can change the color of the outer surface 72 of the film relative to layers not subject to the treatment.

Methods of internally patterning diffusely reflective optical films to create indicia 70 may be carried out without use of selective application of pressure and without use of a selective thinning of the film. Rather, the patterning by selectively reducing, in a second zone (the indicia area 70) but not in a neighboring first zone or area 73, the birefringence of at least one of the polymer materials that are separated into distinct first and second phases in a blended layer of the optical film. In other cases, the internal patterning may be accompanied by a substantial change in thickness, the thickness change being either thicker or thinner depending on processing conditions.

The diffusely reflective optical films may utilize a blended layer in which at least one of the first and second phases is a continuous phase, and the first and/or second polymer material associated with the continuous phase is birefringent in the first zone. The selective birefringence reduction can be performed by delivery of an appropriate amount of energy to the second zone so as to selectively heat at least one of the blended polymer materials therein to a temperature high enough to produce a relaxation in the material that reduces or eliminates a preexisting optical birefringence. In some cases, the elevated temperature during heating may be low enough, and/or may persist for a brief enough time period, to maintain the physical integrity of the morphological blend structure within the film. In such cases, the blend morphology of the second zone is substantially unchanged by the selective heat treatment, even though the birefringence is reduced. The reduction in birefringence may be partial or it may be complete, in which case one or more polymer materials that are birefringent in the first zone are rendered optically isotropic in the second zone. The selective heating can be achieved at least in part by selective delivery of light or other radiant energy to the second film zone. The light may include ultraviolet, visible, or infrared wavelengths, or combinations thereof. At least some of the delivered light can be absorbed by the film to provide the desired heating, with the amount of light absorbed being a function of the intensity, duration, and wavelength distribution of the delivered light, and the absorptive properties of the film. Such a technique for internally patterning a blended film is compatible with known high intensity light sources and electronically addressable beam steering systems, thus allowing for the creation of virtually any desired pattern or image in the film by simply steering the light beam appropriately, without the need for dedicated hardware such as image-specific embossing plates or photomasks.

The indicia 70 that are provided on the outer surface 72 of the flexible flap 22 may be a trademark or brand of the manufacturer of the valve. Absorbing agents, such as suitably absorbing dyes or pigments, may be included in the flap films to selectively capture the radiant energy at a desired wavelength or wavelength band, the radiant energy so delivered to selectively heat the films. When the films are formed by co-extrusion of multiple layers, these absorbing agents may be selectively included in particular layers to control the heating process and thus the through-thickness reduction of birefringence. When multiple blended layers are co-extruded, at least one may include an absorbing agent while at least one may not include an absorbing agent, or substantially every co-extruded blended layer may include an absorbing agent. Additional layers such as internal facilitation layers and skin layers also may be incorporated into the construction.

The optical films that are used in the flexible flaps of the disclosure may include a blended layer that extends from the surrounding area 73 to the indicia area 70 of the film. The blended layer may include first and second polymer materials separated into distinct first and second phases, respectively, and the blended layer may have substantially the same composition and thickness in the indicia and non-indicia areas. At least one of the first and second phases may be a continuous phase, and the first and/or second polymer material associated with the continuous phase may be birefringent in the surrounding area or zone, e.g., it may have a birefringence of at least 0.03, or 0.05, or 0.10 at a wavelength of interest such as 633 nm or another wavelength of interest. The layer may have a first diffusely reflective characteristic in the surrounding area 73, and a different second diffusely reflective characteristic in the indicia area 70. The difference between the first and second diffusely reflective characteristic may not be substantially attributable to any difference in composition or thickness of the layer between the first and second zones. Instead, the difference between the first and second diffusely reflective characteristic may be substantially attributable to a difference in birefringence of at least one of the first and second polymer materials between the first and second zones. In some cases, the blended layer may have substantially the same morphology in the indicia and non-indicia areas. For example, the immiscible blend morphology in the indicia and non-indicia areas (e.g., as seen in microphotographs of the blended layer) may differ by no more than a standard variability of the immiscible blend morphology at different places in the surrounding area due to manufacturing variations. The first diffusely reflective characteristic, e.g., $R_1$, and the second diffusely reflective characteristic, e.g., $R_2$, are compared under the same illumination and observation conditions. For example, the illumination condition may specify the incident light, e.g., a specified direction, polarization, and wavelength, such as normally incident unpolarized visible light, or normally incident visible light polarized along a particular in-plane direction. The observation condition may specify, for example, hemispheric reflectivity (all light reflected into a hemisphere on the incident light-side of the film). If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3. Examples of optical films that may be suitable for use in creating flaps that have indicia as in the present disclosure include those described in U.S. Patent Publication Nos. 2011/0255163, 2011/0286095, 2011/0249332, 2011/0255167, and 2013/0094088 to Merrill et al.

As light travels onto and through a flexible flap, it can reflect off the flexible flap, it can be absorbed in the flexible flap (e.g., energy is converted to heat), or the light can continue to transmit through the flexible flap. The sum of the percent reflection, the percent transmission, and the percent absorption is equal to 100%. Generally, because of this additivity, reflection peaks correspond to transmission wells. The color perceived by the viewer can be a reflective color or the complementary transmitted color depending on the environmental (e.g., mounting and lighting) conditions surrounding the flexible flap and the viewer. Therefore, both transmission and reflection measurements can be used to characterize the optical behavior of the flexible flap. For band characterizations including band-shifting (i.e., color-shifting) with angle, either measurement type is appropriate. "Flashing" generally occurs because the viewer perceives a strong specular reflection off the flexible flap at some angles depending on lighting conditions, while the strong specular reflection is absent at other viewing angles. A measurement of the specular component of the reflectivity can characterize the ability to "flash." "Flashing," i.e., the rapid increase in light intensity from the flexible flap surface with an increase in viewing angle, increases with the amount of specular reflection off the flexible flap. A mostly diffusely reflecting surface will mostly exhibit a darkening as the surface is tipped away from the light source. Very low levels of flashing may be evident at low levels of specularity (e.g., the specular component of the reflectivity around 5-10%), but at least 20% specular reflectivity may be preferred to achieve modest or better flashing. For strong flashing, at least 40% specular reflectivity may be preferred, still more preferably at least 60%. In each of these cases, the specular reflectivity should occur in at least a portion of the visible band (i.e., in a portion of the range 400 nm-750 nm).

EXAMPLES

Flashing Test

Both reflection and transmission spectra are measured in a Perkin-Elmer (Waltham, Mass.) Lambda 950 spectrophotometer using a O/D geometry having a 150 mm integrating sphere that conforms to AST, DIN and CIE guidelines. For transmission measurements, the flexible flap sample is placed in front of the aperture of the integrating sphere. Before carrying out the transmission measurement, the device is calibrated for 100% transmission without the sample in place and again calibrated for 0% transmission with the beam blocked. For measurement of reflection at near-incident angle (i.e. 8 degrees), the sample is placed at the back port of the integrating sphere with the plug removed. Prior to reflectance measurement, the device is calibrated with a polished aluminum reflectance NIST standard (NBS 2024—Second Surface Mirror Specular Spectral Reflectance) mounted in the sample location at the back port and a second calibration with blocked beam is also applied. The total reflectivity is thus measured. A second measurement is then accomplished on the same sample by removing the port for the specular beam reflecting from the sample. Thus the diffuse component of the reflectivity is determined by this specular excluded geometry that substitutes a +/−6° light trap about the 8° reflection angle of the specular beam. The specular component of the reflectivity across the spectrum is taken as the difference between these total and diffuse component measurements.

Band Shifting Test

Off-normal specular reflectance measurements can be achieved with a Perkin-Elmer (Waltham, Mass.) Lambda 950 spectrophotometer equipped with a Universal Reflectance Accessory. This absolute reflectivity technique allows reproducible measurements at various angles of incidence up to about 60 degrees off-normal without any manual adjustments to the spectrophotometer optics or the sample position.

Band shifting also can be measured while the flap is in motion. A custom system may be utilized that has a rotating sample stage to hold the flexible flap at various angles between the light source and a detector. The custom system is equipped with a Quartz Tungsten Halogen lamp powered by a stabilized source and that had a custom 4 inch Spectralon™ sphere (Labsphere, Inc., North Sutton N.H.) as a light source to measure sample transmission using a D/O geometry. Two detectors, a Silicon Charge-Coupled Device (CCD) for the visible and near infrared (NIR), and an InGaAs diode array for the remainder of the NIR, were used. A simple spectrograph with a Czerny-Turner optical layout and a single grating is used for light dispersal onto each detector. This allows optical transmission measurement of flap samples with incident measurement angles varying between 0 degrees and 60 degrees over a wavelength range of 380 nm to 1700 nm. A Glan-Thompson polarizer is used to obtain s-polarized and p-polarized measurements along specified flexible flap orientation directions. The flexible flap film was mounted so that the principal directions of stretching (so-called "x" and "y" directions) were aligned along the axis of rotation (0 degrees) and perpendicular to that axis (90 degrees). In this manner, the transmission of s-polarized light through the flexible flap film is measured along the film's y-direction and the transmission of p-polarized light through the flexible flap film is measured along the film's x-direction. The flexible flap films in the examples were nearly isotropic in-plane, so the various measurements generally represented the s- and p-polarized transmission through the flexible flap film. Likewise, the average of these results would provide the transmission of un-polarized light through the film as would be generally viewed by a typical observer under normal environmental conditions.

Band shifting is reported as a percent change in band edge in the visible spectrum. Typically, at least a 4% relative shift in a band edge in the visible spectrum at some available viewing angle is needed for a person to perceive a clear color shift. For example, if the band edge is 561 nm at normal viewing and 532 nm at 30 degrees viewing, then there is a 5.1% relative shift with this 30 degree change in viewing angle. In some cases, depending on band shape, depth (% transmission or reflection change in the color band from baseline) or band edge position in the visible spectrum, a 10% or even 15% relative shift is desirable at some available viewing angle (e.g. 45 or 60 degrees).

Valve Breathing Efficiency Test

Exhalation valve efficiency plays a key role in the comfort level experienced by respirator users. Percentage of the total air flow that passes through the valve measures this efficiency during a sinusoidal breathing cycle.

The measurement starts with measuring the pressure drop performance of a 3™ 8511 respirator having the valve closed off to create a plot of flow rate as a function of pressure drop. Using this data, a proxy to pressure drop is created using a 13.97 centimeter (cm) diameter, exposed area HD-2583 fiberglass filter available from Hollingsworth & Vose, 112 Washington St., E. Walpole, Mass. 02022, and placed in the holder of a vertically oriented chamber 13.97 cm in diameter and 3.81 cm deep. Concentric to this chamber is a 3.81 cm internal diameter pipe, 8.9 cm long, pneumatically connecting this chamber, via a T intersection, to a second chamber that is 7.62 cm in height and 10.16 cm in diameter. The top surface of this second chamber is level with the ground and has a port 21 mm in diameter in the center of the disk, forming the top surface of the second chamber. The base of the second chamber is concentrically connected to a pipe that is 13.34 cm long with a 5.08 cm internal diameter. Within the pipe length is hexagonal aluminum mesh that has a hexagon side-to-side distance of 3 mm and a length of 5 cm. This hexagonal mesh collimates the air flow through this pipe as it enters the second chamber. The top of this air inlet pipe resides 5 cm below and is concentric with the 21 mm diameter port on the level, top surface. The test method tests each valve against the exact same filter media, constraining the test variable to just the valve.

A valve is mounted to the 21 mm port, and the base sealed so that no leakage occurs around the valve base. Collimated air passes through the inlet pipe and exits through the valve and/or the filter media. Measurements are made by setting the pressure drop (ΔP) and measuring the resultant air flow (Q), in L/min, through the system. The air flow ($Q_f$) at any given pressure drop is known for the filter media alone: $Q_f$=15.333x+1.263, where x is the pressure drop in mm of $H_2O$. The air flow ($Q_T$) at any given pressure drop is measured for the valve plus filter system, and the difference between the two measurements allows the determination of the percent total air flow that passed through the valve ($Q_v$): $Q_v=Q_T-Q_f$ at a given pressure drop. The percent of the total volume of air that passed through the valve can be determined as follows:

$$\%\ \text{Total Air through the valve} = 100\frac{Q_v}{Q_T}.$$

Using the data collected with the valve on the fixture, a table is generated that includes flow rate in L/min and the % air that passed through the valve at that flow rate. A report prepared by the EPA, EPA/600/R-06/129F, May 2009, pgs 4-3 and 4-4, presents data on the average daily ventilation rate for males and females. The maximum mean daily value from this set of data is 14.54 L/min for males, aged 41 to <51 years. All other means, in this data set, report a lower value. This was rounded up to 15 L/min for the comparative analysis. Using the reference published by Gupta, J. K., Lin, C.-H., and Chen, Q. 2010, "Characterizing exhaled airflow from breathing and talking," Indoor Air, 20, 31-39, it was determined that at 15 liters per minute (L/min) the respiration rate is 19 breaths per minute. Using 15 L/min and 19 breaths per minute the following equation was used to generate flow rate as a function of time for a male breathing at 15 L/min:

$$\text{flow rate in L/min} = 47.12389\ \sin\left(\frac{19t}{60(2\pi)}\right)$$

where 47.12389 is the peak flow rate=π×breathing rate (15 L/min) and t is the time in seconds. A table is generated of flow rate as a function of time, using 0.01 second steps up to the peak of the sine curve at 0.79 seconds. The percent air as a function of flow rate is fit to a polynomial equation, and this equation is used to calculate the percent air passing through the valve as a function of time by inputting the flow rate corresponding to each 0.01 second time interval of the sine equation into the percent air as a function of flow rate polynomial. Now there is a one to one correspondence between time and percent air flowing through the valve. At each interval of time, 0.01 seconds, the total air flow, given by the sine equation is multiplied by the percent air passing through the valve, to yield the volume of air, in L/min, passing through the valve. The integral of the ½ sine curve of air as a function of time×2, gives the total volume of air that passed through the system ($Q_T$) during one exhalation cycle. The integral of the time versus air flow through the valve×2 yields the total volume of air that passed through the valve in this same exhalation cycle, ($Q_v$). From this, the percent of the total volume of air that passed through the valve can be determined using $$\%\ \text{Total Air through the valve} = 100\frac{Q_v}{Q_T}.$$

Example 1 and 1C

Examples 1 and 1C tested two different flexible flaps using the same valve body described in U.S. Pat. No. 5,325,892 to Japuntich et al. The flexible flap in Example 1 is a 35.6 micrometers (μm) multilayer optical film that included of 112 layer pairs of PET and coPMMA. Of the 35.6 μm thickness, two skins of equal thickness of PET contribute 6.1 μm each, while 224 optical layers contributed 23.4 μm were included in the film. Comparative example 1C used a conventional isoprene flexible flap 457 μm thick, the same material as reported in the '892 patent. The percent air that passed through the valve was determined for both Example 1 and Example 1C, using the Valve Breathing Efficiency Test. The valve were also tested for flashing and band shifting. The results are reported below in Table 1.

TABLE 1

| | 1 | 1C Comparative Example |
|---|---|---|
| Flashing | Yes | No |
| Color Shift | Yes | No |
| % Total Air Through the Valve | 25.7% | 13% |

Off-normal specular reflectance measurements were taken using a Perkin-Elmer (Waltham, Mass.) Lambda 950 spectrophotometer equipped with a Universal Reflectance Accessory. At near normal incidence of 8 degrees, the flexible flap of Example 1 had short and long wavelength band edges with 54% specular reflection at 599 nm and 697 nm, respectively. Between these band edges, the specular reflectivity increased to up to 97% specular reflection. Outside this band, the specular reflectivity fell to about 10%. Both band edges shifted lower with increasing angle off-normal. The short wavelength band edge dropped to 561 nm, 524 nm and 489 nm at 30°, 45°, and 60°, respectively. Thus, the resulting relative drops in the band edge were 6.3%, 12.5% and 18.3% at 30°, 45°, and 60°, respectively. For the flexible flap of comparative Example 1C, the specular reflection was under 2% across the visible range; thus also, no discernible band edge in the specular reflection existed.

Example 2

A valve seat was used that had an elastomeric seal surface as described in U.S. Pat. No. 7,188,622 to Martin et al. The hardness of the seal surface was 30 Shore A. The valve seat had a slightly curved seal surface shape when viewed from the side, generated by a spline curve, that resulted in a 254 μm height difference between the far edge of the seal surface, the edge furthest from the mounting platform and the edge nearest the mounting platform, which is at the same elevation as the mounting platform. The valve used a 58.42 μm thick multilayer optical film for the flexible flap and had a valve cover as described in U.S. Pat. Nos. 8,365,771 and D676,527 S. The valve was tested for flashing, band shifting, and breathing efficiency. Table 2 presents the results of measurements taken for Example 2.

TABLE 2

| | Example 2 |
|---|---|
| Flashing | Yes |
| Color Shift | Yes |
| % Total Air Through the Valve | 64.9% |

Example 3

A spatially tailorable optical film, which may function as a flexible flap for this disclosure, was made as described generally in WO 2010/075357 (Merrill et al.) from a red-reflecting multilayer optical film, which is referred to here as Film D. Film D was formed by co-extrusion of approximately 300 alternating layers of two polymeric materials, one containing an infrared absorbing dye of chosen concentration, casting the extrudate into a quenched web, and stretching this cast web biaxially to form the red-reflecting Film D.

To make Film D, a 90/10 mol % first copolymer, a so-called "90/10 coPEN" of PEN and PET sub-unit (including 90 mol % naphthalene dicarboxylate, 10 mol % terephthalate as the carboxylates of Example 1 of U.S. Pat. No. 6,352,761 (Hebrink et al.)), was used for the high index optical layers. A second copolymer, Eastman™ Copolyester SA115B (available from Eastman Chemicals, Kingsport Tenn. USA), was used for the low index optical layers. A master batch included 1 wt % Amaplast IR-1050 infrared absorbing dye (available from ColorChem, Atlanta Ga.) was formed by milling a suspension of the Amaplast in ethylene glycol with a Solplus R730 surfactant (available from Lubrizol, Cleveland Ohio) and adding this suspension to the reactor vessel to make the 90/10 coPEN polymer dye-loaded master batch. The master batch was introduced into the high index optics 90/10 coPEN resin feed stream for the co-extrusion process in the weight proportion of 1:3 to the pure copolymer. The coPEN was combined into approximately 150 high index layers alternating with another approximately 150 layers of the 70%/30% mixture of the SA115B in the low index layers, these optical layers include high and low index material in the weight proportion of about 9:10. The outer layers of the coextruded layers within the feed block were protective boundary layers (PBLs) also including SA115B. These approximately 300 layers formed an optical packet. The PBLs were about 15 wt % of the total flow of this optical packet. A final co-extruded pair of skin layers, including 90/10 coPEN, was co-extruded in a total weight proportion of about 6:5 to the optical packet. The extruded web was quenched, heated above the glass transition temperature of the first copolymer, stretched over rollers in a length orienter to a draw ratio of about 3.9, and then heated to approximately 125° C. and stretched transversely to a draw ratio of about 4 in a tenter. The film was heat set at about 238° C. after stretching and wound into a roll of film. The resulting optical Film D was approximately 53 microns thick.

Figure 12A:
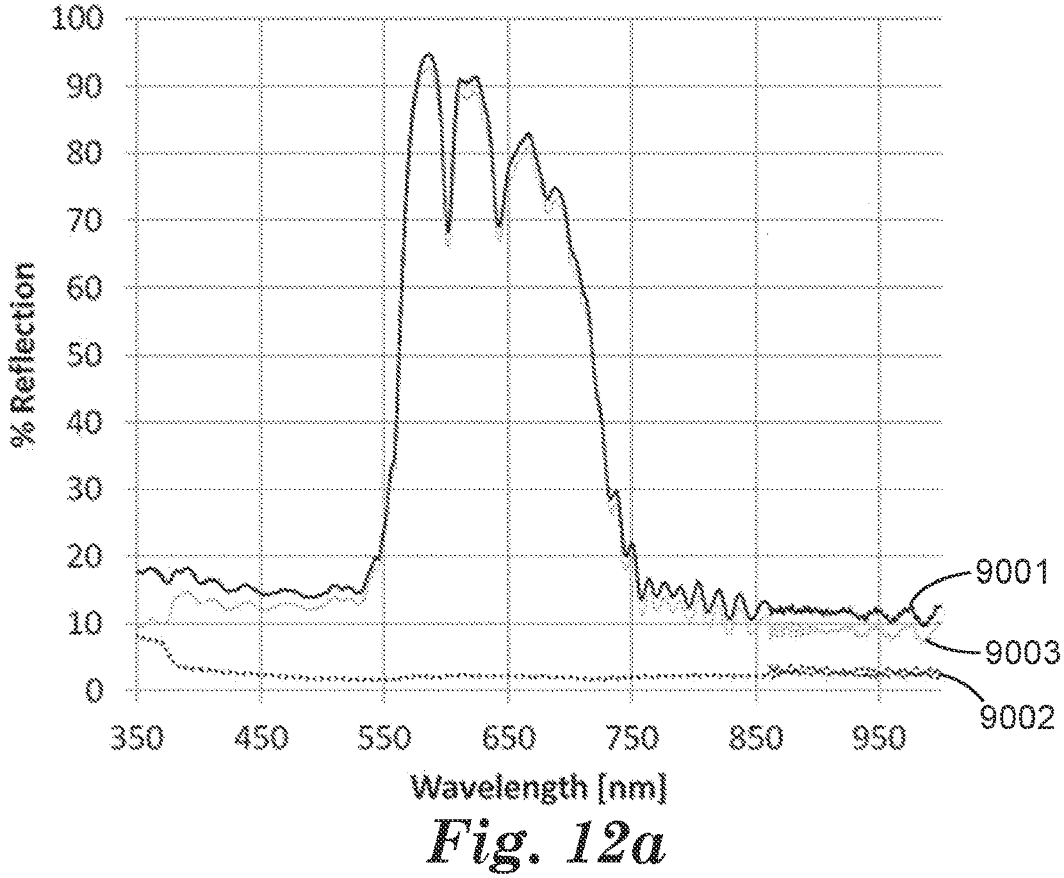

Film D generally exhibited a cyan (transmissive) color in normal viewing, shifting to purple, and ultimately to magenta at highest off-normal viewing angles. Depending on the lighting, the film would flash to a metallic copperish red color (the reflective color) at certain angles. The specular reflection of Film D was measured using a Lambda 950 (available from Perkin-Elmer, Waltham Mass.) as previously described. Typical spectra for the total reflectivity, diffuse component reflectivity, and specular component reflectivity are provided in the visible band as curves 9001, 9002 and 9003 of FIG. 12*a*. Reflection measurements were taken on both sides of the film with very similar results. The results presented in FIG. 12*a* are with the thickest layers of the optical stack closest to the light source. FIG. 12*a* shows that the reflection from this material is mostly specular. Reflection within the band is well over 60% specular, exceeding 90% in a portion of the visible spectrum.

Figure 12B:
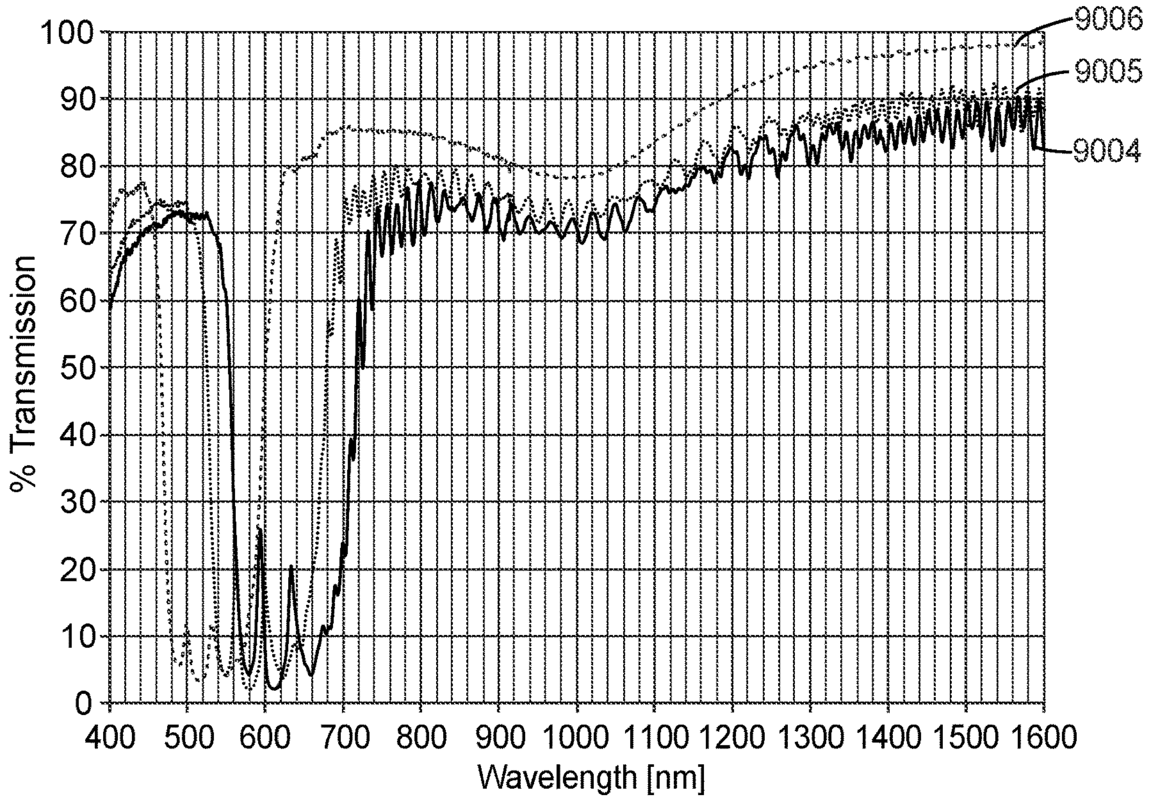
Figure 12C:
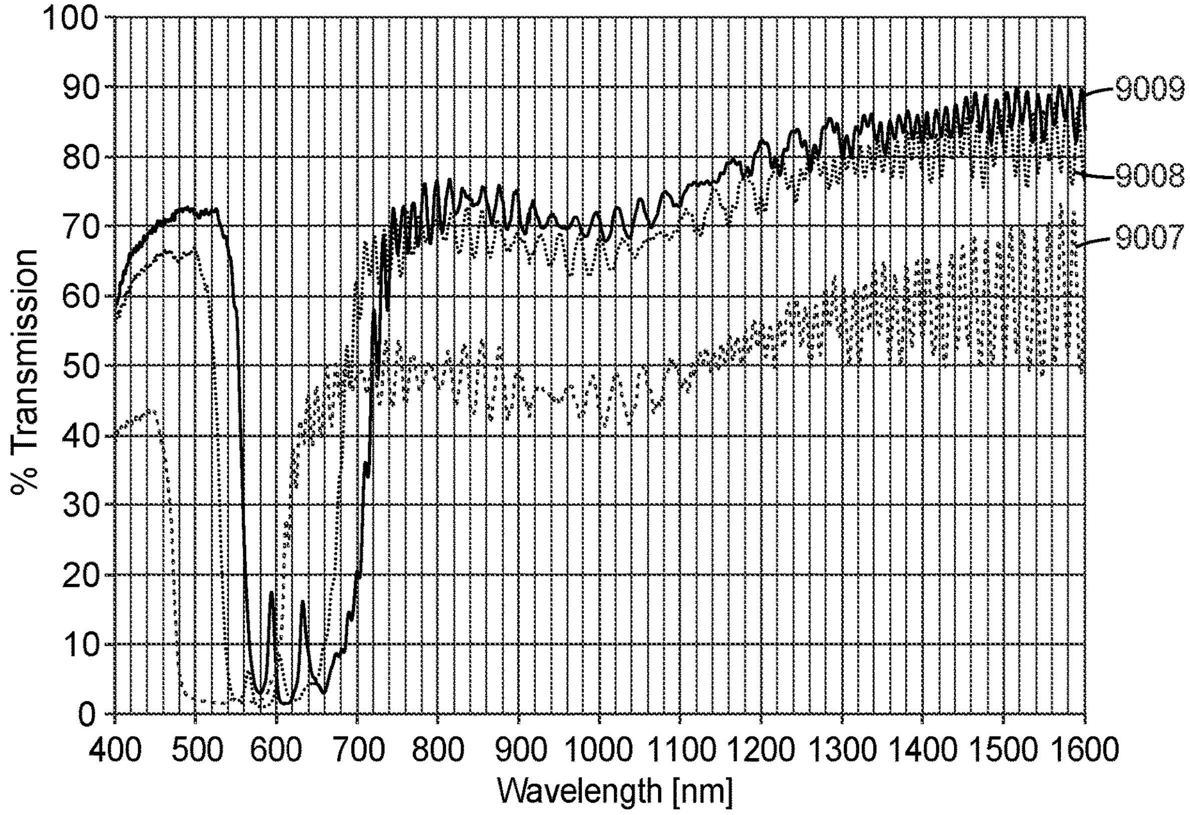

Transmission measurements at 0 degrees, 30 degrees, and 60 degrees from normal were taken using the Band Shifting Test described above for both p-polarized and s-polarized light, as presented in FIGS. 12*b* and 12*c*, respectively. In FIG. 12*b*, curve 9004 represents transmission at 0 degrees, curve 9005 represents transmission at 30 degrees, and curve 9006 represents transmission at 60 degrees. And in FIG. 12*c*, curve 9007 represents transmission at 0 degrees, curve 9008 represents transmission at 30 degrees, and curve 9009 represents transmission at 60 degrees. For this particular film, the band positions with angle are very similar for both polarization states. The band edges can be defined, in one typical measure, as the edges of the reflection peak (transmission well), typically taken as 50% of the difference between the baseline value and the average band residual normal transmission over a relevant central portion. Using the s-pol data, the residual transmission through the central portion of this band (between 580 nm and 660 nm) was about 6%. The short and long wavelength band edges ($\lambda 1$ and $\lambda 2$ respectively) of the Film D were thus approximately 554 nm and 725 nm, respectively. Alternatively, for strong reflection bands in which the percent transmission varies by at least 50% from the baseline, a convenient fixed % transmission value can be used as the band cut off to compare between conditions of different viewing angle for a particular, given film. In this example, a band cutoff transmission was chosen at 20% transmission. Thus, the approximate band edges were taken as 561 and 701 nm using both the s-pol and the p-pol data.

Using the p-polarization data, the short and long wavelength band edges are found, using a 20% band transmission for these films to be 561 nm and 701 nm for a viewing angle of 0 degrees, 532 nm and 673 nm for a viewing angle of 30 degrees, and 473 nm and 609 nm for a viewing angle of 60 degrees. Thus also, for example, at 30 degrees, the percent shift in short wavelength band edge was 5.1%.

Film D was laser patterned as a free-standing, non-laminated film. To reduce wrinkling during processing, as well as provide a heat sink that may have otherwise been provided by a laminated coating, the film was placed upon a mirror-finished metallic plate, and both the plate and Film D were positioned on a vacuum stage available from Thorlabs-Inc., Newton, N.J., to tautly secure the Lamination D against the plate surface. A glass plate (e.g. a microscope slide) was then place on top of the film to further reduce wrinkling. Film D was then exposed to radiation from a 20

W pulsed fiber laser (manufactured by SPI Lasers, Southhampton, UK) with a wavelength of 1064 nm so as to be selectively patterned by a hurrySCAN//14 galvanometer scanner (SCANLAB AG, Puccheim, Del.) and focused by an f-theta lens designed for 1064 nm (Sill Optics GmbH, Wendelstein, Del.). The exposure pattern corresponded to the desired indicia, in this case, "3M" and "N95" written in successive lines. The patterns were rastor-scanned images, so that the laser's beam started at the top left corner of the pattern; it proceeded in a linear path to the furthest right edge of the pattern; the laser power was set to zero until the scanner was set back to the left edge just below the last scan; then the laser power was turned back on so as to continually proceed in the same way until the entire pattern was completed. The maximum average laser power value during the scan was set to 3.5 W as measured by a thermopile sensor (LabMax-TOP, Coherent, Inc., Santa Clara, Calif.). Further conditions of processing were a pulse repetition rate of 500,000 Hz, a pulse duration of 9 ns, and a linear scan rate of 250 mm/s. To reduce the tendency toward surface defects such as charring and delamination, the stage was set so that the contact surface of the metal plate and Film D was approximately 5.5 mm in front of the focal point of the f-theta lens, giving an effective laser beam diameter of approximately 130 microns.

As a result of the laser treatment, the patterned portions were mostly clear with only some residual color. In particular, the patterned portions exhibit the indicia pattern "3M N95" in a slight residual cyan hue compared to deeper cyan color of the unpatterned film.

This disclosure may take on various modifications and alterations without departing from its spirit and scope. Accordingly, this disclosure is not limited to the above-described but is to be controlled by the limitations set forth in the following claims and any equivalents thereof.

This disclosure also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. A respirator, comprising:
- a harness;
- a mask body; and
- an exhalation valve disposed on and attached to the mask body, wherein the exhalation valve comprises:
  - a valve seat;
  - a valve cover; and
  - a flexible flap that is in engagement with the valve seat, the flexible flap comprising at least a specularly reflecting film that causes the flap to flash when moving from a closed position to an open position or vice versa, and wherein the valve cover is sufficiently transparent to enable the flexible flap to be seen through a solid portion of the valve cover.

2. The respirator of claim 1, wherein the flexible flap exhibits band shifting.

3. The respirator of claim 1, wherein the flexible flap comprises a band shifting film.

4. The respirator of claim 3, wherein the band shifting film is attached to an outer surface of the flexible flap.

5. The respirator of claim 3, wherein the band shifting film comprises a multilayer polymeric film.

6. The respirator of claim 5, wherein the multilayer polymeric film comprises a colored mirror.

7. The respirator of claim 5, wherein the multilayer polymeric film comprises a polarizer.

8. The respirator of claim 1, wherein the flexible flap comprises a diffusely reflective optical film.

9. The respirator of claim 1, wherein when the flap is in the closed position, exhaled air may not pass through the valve cover, and wherein when the flap is in the open position, exhaled air may pass through the valve cover.

10. A respirator, comprising:
- a mask body;
- a harness attached to the mask body; and
- an exhalation valve disposed on and attached to the mask body, wherein the exhalation valve comprises a valve seat, a valve cover, and a flexible flap that is in engagement with the valve seat, wherein the flexible flap comprises a band shifting film that flashes when moving from a closed position to an open position or vice versa and the valve cover is sufficiently transparent to enable the flexible flap to be seen through a solid portion of the valve cover.

11. The respirator of claim 10, wherein the band shifting film is attached to an outer surface of the flexible flap.

12. The respirator of claim 10, wherein the band shifting film comprises a multilayer polymeric film comprising alternating layers of first and second polymers.

13. The respirator of claim 12, wherein the multilayer polymeric film comprises a colored mirror.

14. The respirator of claim 12, wherein the multilayer polymeric film comprises a polarizer.

15. The respirator of claim 10, wherein the band shifting film comprises a diffusely reflective optical film comprising a birefringent continuous phase and a disperse phase.

16. The respirator of claim 15, wherein the band shifting film comprises a first zone and a second zone, and wherein a birefringence in the second zone is less than a birefringence in the first zone.

17. The respirator of claim 10, wherein when the flap is in the closed position, exhaled air may not pass through the valve cover, and wherein when the flap is in the open position, exhaled air may pass through the valve cover.

18. A respirator, wherein the respirator is a device that is worn by a person to provide clean air for the wearer, comprising:
- a harness;
- a mask body, wherein the mask body is an air-permeable structure that can fit at least over the nose and mouth of a person and that helps define an interior gas space separated from an exterior gas space, wherein the interior gas space is the space between the mask body and the person's face and wherein the exterior gas space is the ambient atmospheric gas space into which exhaled gas enters after passing through and beyond the mask body and/or an exhalation valve; and
  - an exhalation valve disposed on and attached to the mask body, wherein the exhalation valve comprises:
    - a valve seat, wherein the valve seat is a solid part of the exhalation valve that has an orifice for a fluid to pass through and is disposed on and attached to the mask body;
    - a valve cover; and
    - a flexible flap that is in engagement with the valve seat, the flexible flap comprising at least a specularly reflecting film that causes the flap to flash when moving from a closed position to an open position or vice versa, and wherein the valve cover is sufficiently transparent to enable the flexible flap to be seen through a solid portion of the valve cover.

19. A respirator, wherein the respirator is a device that is worn by a person to provide clean air for the wearer, comprising:

a mask body, wherein the mask body is an air-permeable structure that can fit at least over the nose and mouth of a person and that helps define an interior gas space separated from an exterior gas space, wherein the interior gas space is the space between the mask body and the person's face and wherein the exterior gas space is the ambient atmospheric gas space into which exhaled gas enters after passing through and beyond the mask body and/or an exhalation valve;

a harness attached to the mask body; and an exhalation valve disposed on and attached to the mask body, wherein the exhalation valve comprises a valve seat, a valve cover, and a flexible flap that is in engagement with the valve seat, wherein the valve seat is a solid part of the exhalation valve that has an orifice for a fluid to pass through and is disposed on and attached to the mask body, and wherein the flexible flap comprises a band shifting film that flashes when moving from a closed position to an open position or vice versa and the valve cover is sufficiently transparent to enable the flexible flap to be seen through a solid portion of the valve cover.

* * * * *